United States Patent
Okano

(10) Patent No.: US 10,990,197 B2
(45) Date of Patent: Apr. 27, 2021

(54) DISPLAY SYSTEM, CONTROL PROGRAM FOR INFORMATION PROCESSING DEVICE, AND METHOD FOR CONTROLLING INFORMATION PROCESSING DEVICE

(71) Applicant: SEIKO EPSON CORPORATION, Tokyo (JP)

(72) Inventor: Keiichi Okano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/784,819

(22) Filed: Feb. 7, 2020

(65) Prior Publication Data
US 2020/0257379 A1 Aug. 13, 2020

(30) Foreign Application Priority Data

Feb. 8, 2019 (JP) .............................. JP2019-021485

(51) Int. Cl.
 *G06F 3/0346* (2013.01)
 *G06F 3/041* (2006.01)
 *G06F 3/14* (2006.01)
 *G06F 3/01* (2006.01)

(52) U.S. Cl.
 CPC ............ *G06F 3/0346* (2013.01); *G06F 3/012* (2013.01); *G06F 3/041* (2013.01); *G06F 3/14* (2013.01)

(58) Field of Classification Search
 CPC ........ G06F 3/012; G06F 3/0346; G06F 3/041; G06F 3/14; G06F 1/1694; G06F 3/011; G06F 3/017; G06F 3/04842; G06F 3/0485; G06F 3/04855; G06F 3/04883; G06F 2200/1637; G06T 19/006; G02B 27/017
 See application file for complete search history.

(56) References Cited

U.S. PATENT DOCUMENTS

2017/0329419 A1* 11/2017 Dearman ................ G06F 3/011
2019/0065026 A1*  2/2019 Kiemele ............. G06F 3/04815
2019/0079599 A1*  3/2019 Lee .......................... G06T 19/20

FOREIGN PATENT DOCUMENTS

JP        2015-197694 A    11/2015

* cited by examiner

*Primary Examiner* — Nelson M Rosario
(74) *Attorney, Agent, or Firm* — Oliff PLC

(57) ABSTRACT

A display system includes an HMD mounted on a head of a user, and a smartphone to which the HMD is coupled, and the smartphone includes a touch sensor that accepts a position input operation and detects coordinates of an operating position with reference to set coordinate axes, a magnetic sensor that detects an orientation of the touch sensor, and an adjustment unit that adjusts an orientation of the coordinate axes, based on a detection result of the magnetic sensor.

13 Claims, 11 Drawing Sheets

DISPLAY SYSTEM, CONTROL PROGRAM FOR INFORMATION PROCESSING DEVICE, AND METHOD FOR CONTROLLING INFORMATION PROCESSING DEVICE

The present application is based on, and claims priority from JP Application Serial Number 2019-021485, filed Feb. 8, 2019, the disclosure of which is hereby incorporated by reference herein in its entirety.

BACKGROUND

1. Technical Field

The present disclosure relates to a display system, a control program for an information processing device, and a method for controlling the information processing device.

2. Related Art

Display of an image displayed on a mobile terminal device such as a smartphone, in a mirroring manner on a display device such as an HMD has been known (for example, JP-A-2015-197694).

The mobile terminal device described in JP-A-2015-197694 includes a touch panel and a processor. The processor, based on setting information associated with contents, switches an operation mode of the mobile terminal device from a first mode for accepting a touch input while displaying the contents on the touch panel, to a second mode for accepting a touch input without displaying the contents on the touch panel. The contents are then displayed on a display of the display device, when the operation mode is switched.

In the configuration described in JP-A-2015-197694, there was a problem in that operability for a user is not sufficient in some cases.

For example, there was a case in which, since an orientation of coordinate axes on a touch panel of a smartphone is fixed, the operability for the user was not sufficient in some cases.

SUMMARY

An aspect for solving the above-described problem is a display system including a display device mounted on a head of a user, and an information processing device to which the display device is coupled, in which the information processing device includes a position input unit for accepting a position input operation, and detecting a coordinate of an operating position with reference to a set coordinate axis, a first sensor for detecting an orientation of the position input unit, and an adjustment unit for adjusting an orientation of the coordinate axis, based on a detection result of the first sensor.

In the above display system, the first sensor may be configured to include at least one of an acceleration sensor, a gyro sensor, and a geomagnetic sensor.

In the display system described above, a configuration may be adopted in which the display device includes a display unit for displaying an image, and a second sensor for detecting an orientation of the display unit, and the adjustment unit determines the orientation of the coordinate axis in accordance with the orientation detected by the second sensor.

In the above display system, the second sensor may be configured to include at least one of an acceleration sensor, a gyro sensor, and a geomagnetic sensor.

In the display system described above, the information processing device may be configured to include a coupling portion capable of coupling the display device, and a mode switching unit capable of executing a first mode for accepting an input detected by the position input unit as an input in an absolute coordinate on the coordinate axis, and a second mode for accepting an input detected by the position input unit as an input in a relative coordinate on the coordinate axis, and switching between the first mode and the second mode in accordance with whether the display device is coupled to the coupling portion or not, and executing the mode.

In the above-described display system, the mode switching unit may be configured to, execute the first mode when the display device is not coupled to the coupling portion, and execute the second mode when the display device is coupled to the coupling portion.

In the above-described display system, the adjustment unit may be configured to adjust the orientation of the coordinate axis in a stepwise manner.

In the display system described above, a configuration may be adopted in which the display device includes a third sensor for detecting a position of the information processing device, and the adjustment unit adjusts the orientation of the coordinate axis, based on a detection result of the third sensor.

In the display system described above, the third sensor may be configured to include an imaging sensor.

In the display system described above, a configuration may be adopted in which the information processing device includes a determining unit for determining whether the information processing device is present within a visual field of a user, based on the detection result of the third sensor, and the adjustment unit adjusts the orientation of the coordinate axis, in accordance with a determination result of the determining unit.

In the display system described above, a configuration may be adopted in which, when the determining unit determines that the information processing device is present within the visual field of the user, the adjustment unit adjusts the orientation of the coordinate axis, and when the determining unit determines that the information processing device is not present within the visual field of the user, the adjustment unit regulates the adjustment of the orientation of the coordinate axis.

Another aspect for solving the above-described problem is a control program for an information processing device that includes a computer and to which a display device mounted on a head of a user is coupled, and causes the computer to function as a detector for accepting a position input operation, and detecting an orientation of a position input unit for detecting a coordinate of an operating position with reference to a set coordinate axis, and as an adjustment unit for adjusting the orientation of the coordinate axis, based on a detection result of the detector.

Yet another aspect for solving the above problem is a method for controlling an information processing device to which a display device mounted on a head of a user is coupled, and the method includes a detection step for accepting a position input operation, and detecting an orientation of a position input unit for detecting a coordinate of an operating position with reference to a set coordinate axis, and an adjustment step for adjusting an orientation of the coordinate axis, based on a detection result in the detection step.

DESCRIPTION OF EXEMPLARY EMBODIMENTS

Exemplary embodiments are described below with reference to the accompanying drawings.

1. Configuration of Display System 1-1. Overall Configuration of Display System

Figure 1:
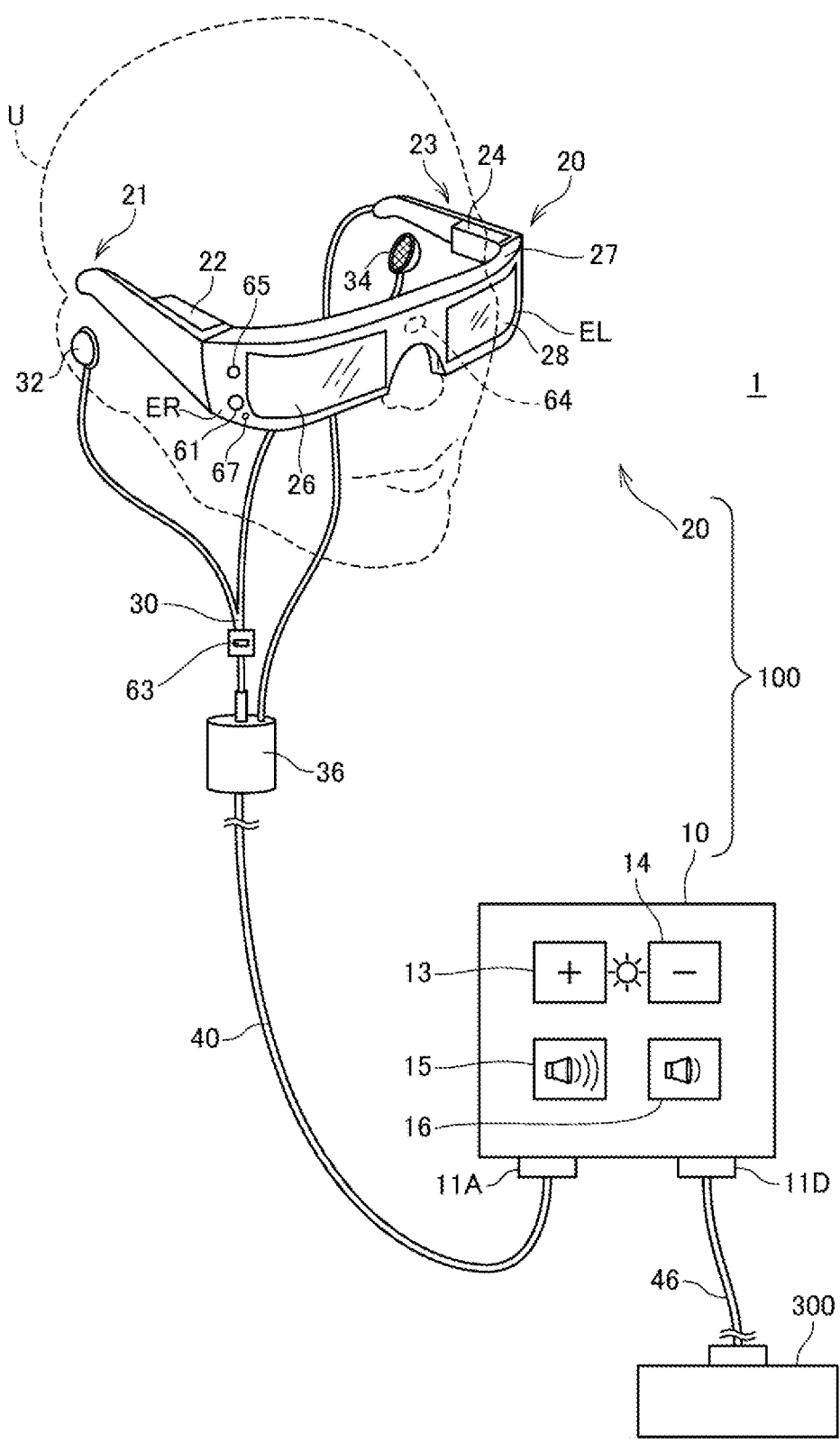
FIG. 1 is a diagram illustrating a configuration of a display system.

FIG. 1 is a diagram illustrating an overall configuration of a display system 1.

As illustrated in FIG. 1, the display system 1 includes a Head Mounted Display (HMD) 100. The HMD 100 is a device including an image display unit 20 mounted on a head of a user, and a coupling device 10, and is a device for causing a virtual image to be visually recognized by the user with the image display unit 20 while mounted on the head of the user. The HMD 100 corresponds to an example of a "display device". In the following description, the user refers to a user who wears and uses the HMD 100.

The coupling device 10 includes a box shaped case, a connector 11A, and a connector 11D. The image display unit 20 is coupled to the connector 11A via a coupling cable 40. Hereinafter, when the connectors 11A and 11D are not distinguished, the connectors 11A and 11D will be referred to as connectors 11. The case of the coupling device 10 can be referred to as a housing or a main body.

The display system 1 is a system configured by coupling a smartphone 300 to the HMD 100. The connector 11D is an interface of the HMD 100 to which the smartphone 300 is coupled. In other words, in the present exemplary embodiment, the smartphone 300 is coupled to the connector 11D. The smartphone 300 corresponds to an example of an "information processing device".

Note that, the smartphone 300 is only one example of the information processing device. It is sufficient that the information processing device is portable by a user, and provided with a position input unit such as a touch sensor, a sensor for detecting an orientation of the position input unit, and a computer. For example, as the information processing device, a Personal Digital Assistant (PDA) terminal, a tablet personal computer, or the like can be coupled to the coupling device 10.

The connectors 11 are wired interfaces to be coupled to a communication cable, and the coupling device 10 is coupled to an external device via the communication cable. The connector 11A includes a terminal configured to couple the coupling cable 40 and an interface circuit configured to transmit and receive a signal via the connector 11A.

The connector 11A is provided to couple the image display unit 20 to the coupling device 10. The coupling cable 40 is configured to supply power from the coupling device 10 to the image display unit 20, and has a function with which the image display unit 20 and the coupling device 10 transmit and receive data to and from each other.

The connector 11D is an interface through which image data can be input from the smartphone 300, and sensor data can be output to the smartphone 300. The smartphone 300 replays content data recorded in a non-volatile storage unit. For example, the connector 11D is a connector conforming to known communication interface standards.

In the present exemplary embodiment, as an example, the connector 11D is an interface corresponding input/output of image data and various types of data, and the smartphone 300 is coupled via a USB cable 46.

For example, a connector of a Universal Serial Bus (USB)-Type C standard can be adopted as the connector 11D. The interface corresponding to USB-Type C is capable of transmitting data according to a USB 3.1 standard and supplying a direct current power within 20 volts and 5 amperes.

Additionally, as a function of an alternate mode of USB-Type C, image data of High Definition Multimedia Interface (HDMI) standards, image data of Mobile High-definition Link (MHL) standards, and the like can be transmitted. The smartphone 300 can provide power supply, transmission and reception of data, supply of streaming data for images and audio, and the like, via the USB cable 46. The alternative mode of USB-Type C is known as Alternative mode. HDMI is a registered trademark.

The image display unit 20 has an eyeglasses-like shape in the present exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The image display unit 20 corresponds to an example of a "display unit".

The right holding part 21 and the left holding part 23 extend rearward from corresponding ends of the front frame 27, to hold the image display unit 20 on the head of the user U. One of the ends of the front frame 27, which lies on the right side of the user U when s/he wears the image display unit 20, is referred to as an end ER, while the other one of the ends, which lies on the left side, is referred to as an end EL. The right holding part 21 extends from the end ER of the front frame 27 to a position corresponding to the right side of the head of the user in a state where the user wears the image display unit 20. The left holding part 23 extends from the end EL to a position corresponding to the left side of the head of the user in a state where the user wears the image display unit 20.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20.

The front frame 27 may include a nose pad provided in the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. A belt may also be attached to the right holding part 21 and the left holding part 23 that fits to the back of the head of the user when the user wears the image display unit 20. In this case, the belt allows the image display unit 20 to be held on the head of the user U.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located near the right side head part of the user in the mounted state. The left display unit 24 is a unit related to image display by the left light-guiding plate 28, and is provided on the left holding part 23 and is located near the left side head part of the user in the mounted state. Note that, the right display unit 22 and the left display unit 24 may be collectively and simply referred to as a "display driving unit".

The right light-guiding plate 26 and the left light-guiding plate 28 are optical parts formed of a light transmissive resin or the like, and are configured to guide imaging light output by the right display unit 22 and the left display unit 24 to the eyes of the user. The right light-guiding plate 26 and the left light-guiding plate 28 are, for example, prisms.

Imaging light guided by the right light-guiding plate 26 and outside light transmitted through the right light-guiding plate 26 are incident on the right eye of the user. Similarly, the imaging light guided by the left light-guiding plate 28 and the outside light transmitted through the left light-guiding plate 28 are incident on the left eye.

An illuminance sensor 65 is arranged on the front frame 27 of the image display unit 20. The illuminance sensor 65 is configured to receive outside light coming from in front of the user wearing the image display unit 20.

A camera 61 is disposed on the front frame 27 of the image display unit 20. The camera 61 is provided at a position that the outside light passing through the right light-guiding plate 26 and the left light-guiding plate 28 is not blocked. In the example of FIG. 1, the camera 61 is disposed on a side of the end ER of the front frame 27, but the camera may also be disposed on a side of the end EL, or may be disposed at a coupling portion between the right light-guiding plate 26 and the left light-guiding plate 28.

The camera 61 corresponds to an example of a "third sensor". The camera 61 corresponds to an example of an "imaging sensor".

The camera 61 is a digital camera equipped with an imaging element, such as a charge coupled device (CCD) or a complementary metal-oxide-semiconductor (CMOS), and imaging lens and the like. The camera 61 according to the present exemplary embodiment is a monocular camera, but may be a stereo camera.

A Light Emitting Diode (LED) indicator 67 is disposed on the front frame 27. The LED indicator 67 is disposed adjacent to the camera 61 at the end ER and is configured to light up while the camera 61 is operating to notify that the capturing is in progress.

A distance sensor 64 is provided on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light that the light emitted by the light source is reflected by the target object to be measured, for example. Further, the distance sensor 64 may be an ultrasonic wave type distance sensor including a sound source configured to generate ultrasonic waves, and a detector configured to receive the ultrasonic waves reflected by the target object to be measured. The distance sensor 64 may be a laser range scanner. In this case, a wider region including an area in front of the image display unit 20 can be scanned.

Each of the right display unit 22 and the left display unit 24 of the image display unit 20 is coupled with the coupling device 10. In the HMD 100, the coupling cable 40 is coupled with the left holding part 23, and wiring coupled with this coupling cable 40 is laid inside the image display unit 20 to couple each of the right display unit 22 and the left display unit 24 with the coupling device 10.

The coupling cable 40 includes an audio connector 36, wherein a headset 30 including a right earphone 32 and a left earphone 34 constituting a stereo headphone, and a microphone 63, is coupled to the audio connector 36. The right earphone 32 is mounted on the right ear of the user and the left earphone 34 is mounted on the left ear of the user. The right earphone 32 and the left earphone 34 can also be referred to as a sound output unit.

The right earphone 32 and the left earphone 34 output a sound based on a sound signal output from the coupling device 10.

The microphone 63 is configured to collect a sound and outputs the sound signal to the coupling device 10. The microphone 63 may be, for example, a monaural microphone or a stereo microphone, or may be a directional microphone or a non-directional microphone.

The coupling device 10 includes a brightness adjusting key 13, a brightness adjusting key 14, and a sound volume adjusting key 15, and a sound volume adjusting key 16 as operated parts to be operated by the user. Each of the brightness adjusting key 13, the brightness adjusting key 14, the sound volume adjusting key 15, and the sound volume adjusting key 16 is composed of a hardware key. These operated parts are disposed on the surface of the main body of the coupling device 10, and may be operated by fingers of the user, for example.

The brightness adjusting keys 13 and 14 are hardware keys for adjusting display brightness of an image displayed by the image display unit 20. The brightness adjusting key 13 is configured to instruct an increase in brightness, and the brightness adjusting key 14 is configured to instruct a reduction in brightness. The sound volume adjusting keys 15 and 16 are hardware keys for adjusting sound volume of sounds output from the right earphone 32 and the left earphone 34. The sound volume adjusting key 15 configured to instruct an increase in sound volume, and the sound volume adjusting key 16 configured to instruct a reduction in sound volume.

1-2. Configuration of Optical System of Image Display Unit of HMD

Figure 2:
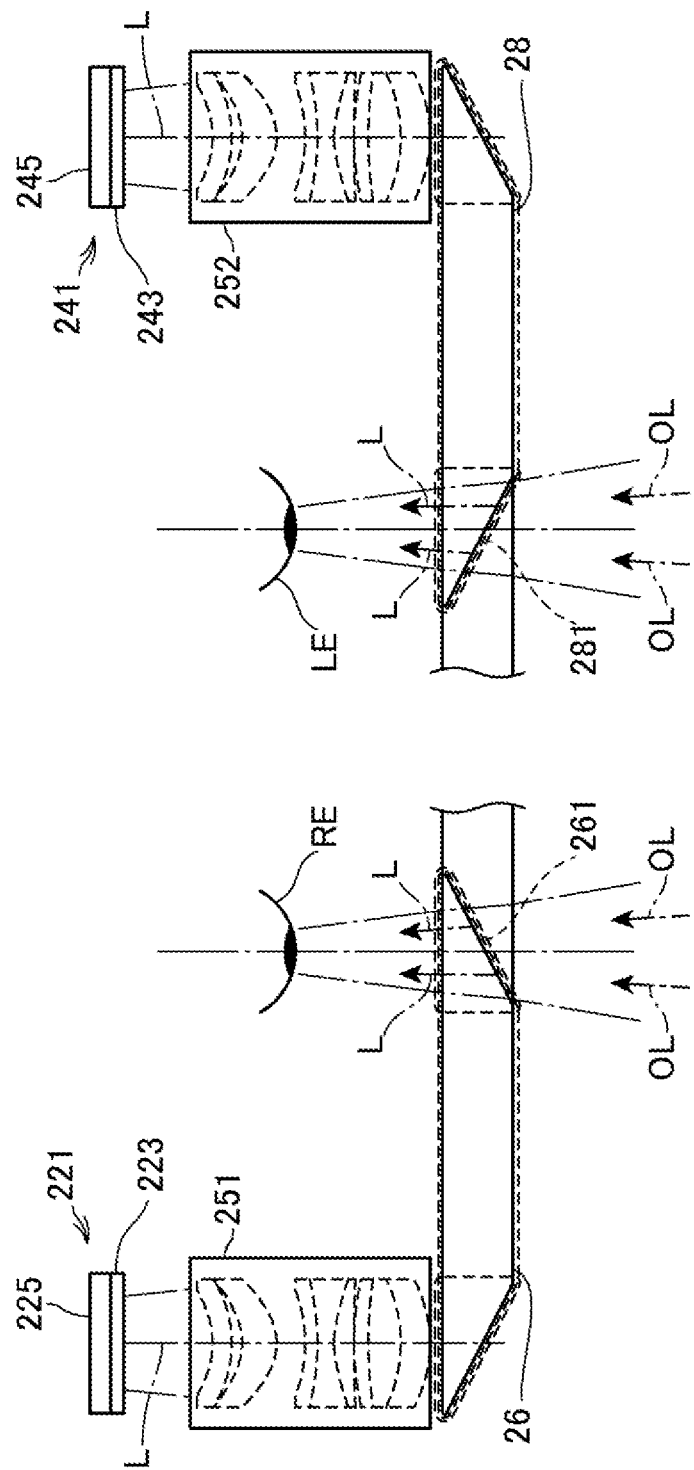
FIG. 2 is a diagram illustrating a configuration of an optical system of an image display unit.

FIG. 2 is a plan view illustrating a main part of a configuration of an optical system included in the image display unit 20. In FIG. 2, a left eye LE and a right eye RE of a user are illustrated for explanation.

As illustrated in FIG. 2, the right display unit 22 and the left display unit 24 are disposed symmetrically on the right- and left-hand sides. As a configuration where the right eye RE of the user is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission type display panel including light-emitting devices disposed in a matrix and configured to emit light by organic electroluminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED drive circuit 225 is controlled by a second control unit 120 to select and power the light-emitting device included in the OLED panel 223 to cause the light-emitting device of the OLED panel 223 to emit light. The second display control unit 120 will be described below with reference to FIG. 4.

Figure 4:
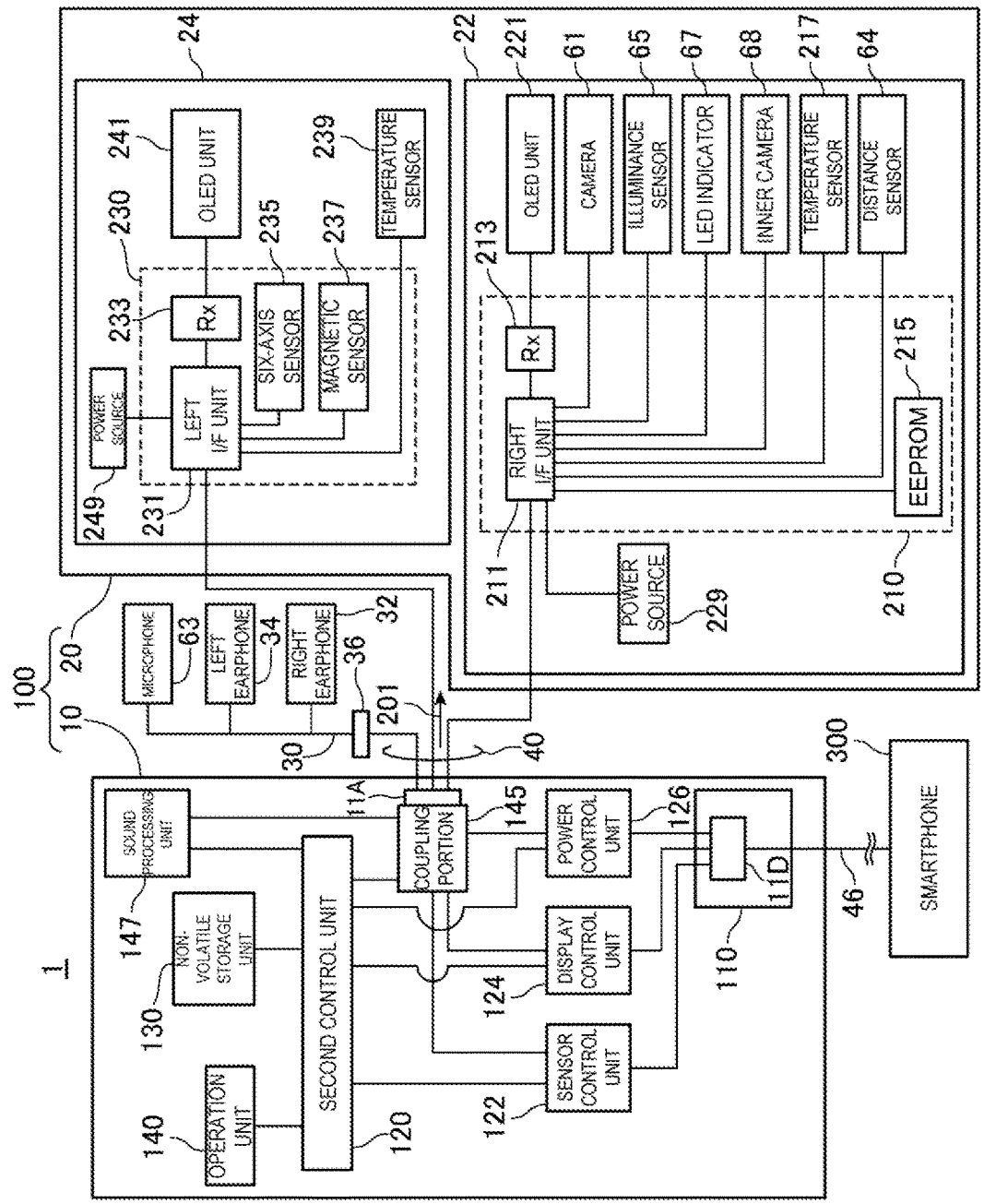
FIG. 4 is a diagram illustrating a configuration of components configuring an HMD.

The OLED drive circuit 225 is fixed by bonding or the like to a rear face of the OLED panel 223, namely, a back side of a light-emitting surface of the OLED panel 223. The OLED drive circuit 225 may include, for example, a semiconductor device configured to drive the OLED panel 223, and may be mounted on a substrate (not illustrated) fixed to the rear face of the OLED panel 223. A temperature sensor 217 illustrated in FIG. 4 is mounted on this substrate.

Note that the OLED panel 223 may include a configuration in which light-emitting devices configured to emit white color light are disposed in a matrix, and color filters corresponding to the R color, the G color, and the B color respectively are disposed to be superimposed on the light-emitting elements. Additionally, the OLED panel 223 of a WRGB configuration including light-emitting devices configured to emit white (W) color light may be used, in addition to the light-emitting devices configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image on a retina of the right eye RE, and causes the user to visually recognize the image.

Additionally, as a configuration in which the left eye LE of the user is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission type display panel configured in a manner similar to the OLED panel 223. The OLED drive circuit 245 is instructed by the second control unit 120 to select and power the light-emitting devices included in the OLED panel 243 to cause the light-emitting devices of the OLED panel 243 to emit light.

The OLED drive circuit 245 is fixed by bonding or the like to a rear face of the OLED panel 243, namely, a back side of a light-emitting surface of the OLED panel 243. The OLED drive circuit 245 may include, for example, a semiconductor device configured to drive the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L is formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina of the left eye LE, and causes the user to visually recognize the image.

According to the configuration, the HMD 100 serves as a transmissive display device. Namely, the imaging light L reflected by the half mirror 261 and outside light OL having passed through the right light-guiding plate 26 enter the right eye RE of the user. Additionally, the imaging light L reflected by the half mirror 281 and the outside light OL having passed through the half mirror 281 enter the left eye LE. Accordingly, the HMD 100 superimposes the imaging light L of an image processed internally and the outside light OL on each other, and causes the imaging light L and the outside light OL superimposed on each other to enter the eyes of the user, and the user views an outside scene through the right light-guiding plate 26 and the left light-guiding plate 28, and visually recognizes the image formed by the imaging light L and superimposed on this outside scene.

The half mirrors 261 and 281 are image extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user. For example, a diffraction grating may be used, or a semi-transmissive reflection film may be used.

Figure 3:
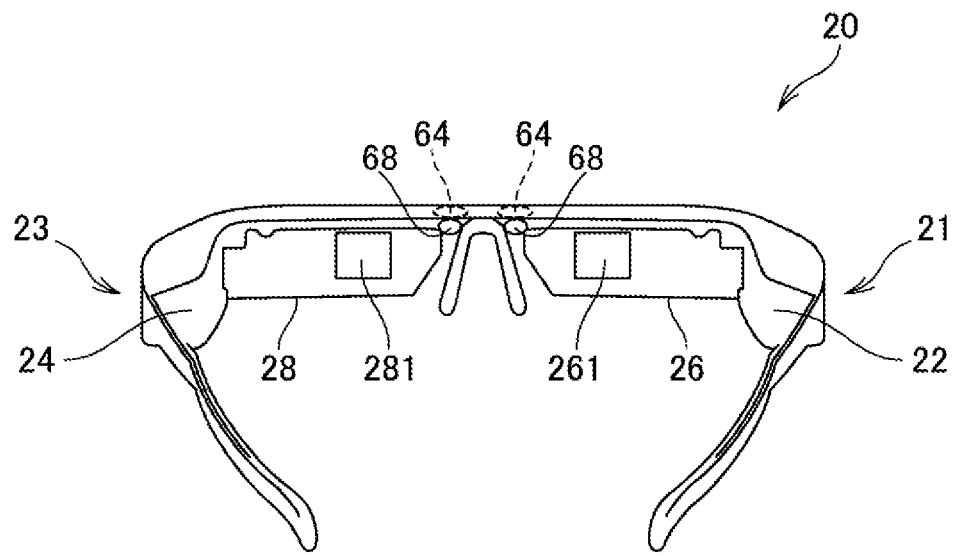
FIG. 3 is a perspective view illustrating a configuration of a main part of the image display unit.
Figure 3:
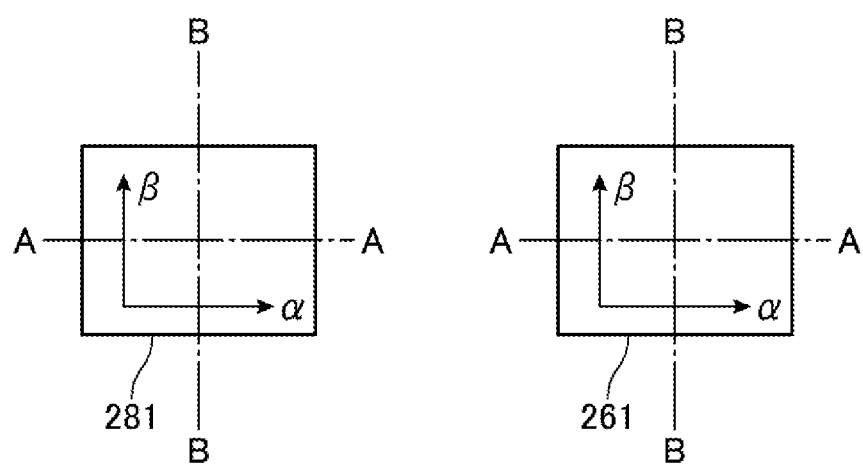

FIG. 3 is a diagram illustrating a configuration of a main part of the image display unit 20. An upper diagram in FIG. 3 is a perspective view of the main part of the image display unit 20 seen from a head side of the user. Note that, in the upper diagram in FIG. 3, illustration of the coupling cable 40 is omitted.

The upper diagram in FIG. 3 illustrates a side contacting the head of the user of the image display unit 20, that is, a side seen from the right eye RE and the left eye LE of the user. In other words, in the upper diagram in FIG. 3, back sides of the right light-guiding plate 26 and the left light-guiding plate 28 are visible.

In the upper diagram in FIG. 3, the half mirror 261 configured to irradiate the right eye RE of the user with imaging light and the half mirror 281 configured to irradiate the left eye LE with imaging light are visible as approximately square-shaped regions. Additionally, all the right light-guiding plate 26 including the half mirror 261 and all the left light-guiding plate 28 including the half mirror 281 transmit the outside light as described above. Thus, the user visually recognizes an outside scene through all the right light-guiding plate 26 and the left light-guiding plate 28, and visually recognizes rectangular display images at positions of the half mirrors 261 and 281.

Inner cameras 68 are disposed on the user side of the image display unit 20. A pair of inner cameras 68 are provided in a central position between the right light-guiding plate 26 and the left light-guiding plate 28 so as to correspond respectively to the right eye RE and the left eye LE of the user. The inner cameras 68 are a pair of cameras that respectively capture an image of the right eye RE and the left eye LE of the user. The inner camera 68 captures an image in accordance with instructions from the second control unit 120. The second control unit 120 analyzes the captured image data of the inner cameras 68. For example, the second control unit 120 detects an image of the reflected light and the pupil on the surface of the eyeball of the right eye RE and the left eye LE from the imaging data of the inner camera 68, and determines a line-of-sight direction of the user. The second control unit 120 may determine the change in the line-of-sight direction of the user and may detect the eyeball movement of each of the right eye RE and the left eye LE.

The inner camera 68 corresponds to an example of the "third sensor".

Here, the movement of the user's line-of-sight can also be seen as movement of the user's virtual viewpoint.

When detecting the line-of-sight direction of the right eye RE and the left eye LE from the captured image of the inner camera(s) 68, the second control unit 120 can determine the convergence angle of the right eye RE and the left eye LE. The convergence angle corresponds to a distance to the object the user fixates on. That is, when the user sterically views an image and an object, the convergence angle of the right eye RE and the left eye LE is determined in accordance with the distance to the object to be viewed. Accordingly, the convergence angle can be detected to evaluate a distance from where the user fixates on. Further, when an image is displayed so to guide the convergence angle of the user, a stereoscopic view can be induced.

A lower diagram in FIG. 3 illustrates coordinate axes of an image displayed on each of the half mirror 261 and the half mirror 281. A line A-A indicates a center line extending in a left and right direction of each of the half mirror 261 and the half mirror 281. A line B-B indicates a center line extending in an up and down direction of each of the half mirror 261 and the half mirror 281.

The coordinate axes of the image displayed on each of the half mirror 261 and the half mirror 281 are constituted by an $\alpha$ axis and a $\beta$ axis. The $\alpha$ axis is set parallel to the line A-A, and the $\beta$ axis is set parallel to the B-B line.

A direction of the line A-A and a direction of the line B-B are detected by a six-axis sensor 235 or a magnetic sensor 237 illustrated in FIG. 4. In other words, the direction of the line A-A line and the direction of the line B-B are detected by a three-axis acceleration sensor, a three-axis gyro sensor, or a three-axis geomagnetic sensor. Note that, in the present exemplary embodiment, the direction of the line A-A and the direction of the line B-B are detected by the magnetic sensor 237.

1-3. Configuration of Components of HMD

FIG. 4 is a diagram illustrating a configuration of components configuring the HMD 100.

The right display unit 22 of the image display unit 20 includes a right display unit substrate 210. On the right display unit substrate 210, a right I/F unit 211 coupled to the coupling cable 40, a reception unit 213 that receives data input from the coupling device 10 via the right I/F unit 211, and an Electrically Erasable Programmable Read Only Memory (EEPROM) 215 are mounted. The right I/F unit 211 couples the reception unit 213, the EEPROM 215, the temperature sensor 217, the camera 61, the distance sensor 64, the illuminance sensor 65, the LED indicator 67, and the inner camera 68 to the coupling device 10. The reception unit 213 couples the OLED unit 221 to the coupling device 10.

The left display unit 24 includes a left display unit substrate 230. On the left display unit substrate 230, a left I/F unit 231 coupled to the coupling cable 40, a reception unit 233 that receives data input from the coupling device 10 via the left I/F unit 231 are mounted. Further, the left display unit substrate 230 is mounted with the six-axis sensor 235 and the magnetic sensor 237.

The left I/F unit 231 couples the reception unit 233, the six-axis sensor 235, the magnetic sensor 237, and the temperature sensor 239 to the coupling device 10. The reception unit 233 couples the OLED unit 241 to the coupling device 10.

I/F is an abbreviation for interface. Note that, in the present exemplary embodiment, the reception unit 213 and the reception unit 233 may be described as Rx213 and Rx233 respectively.

The EEPROM 215 is configured to store various types of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24.

Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read by the second control unit 120.

The camera 61 captures an image in accordance with a signal input via the right I/F unit 211 and outputs imaging data to the right I/F unit 211.

The illuminance sensor 65 is configured to receive the outside light and output a detection value corresponding to an amount of the received light or an intensity of the received light. The LED indicator 67 is configured to light up in accordance with a control signal or a driving current input via the right I/F unit 211.

The inner camera 68 captures an image in accordance with a signal input via the right I/F unit 211 and outputs imaging data to the right I/F unit 211.

The temperature sensor 217 is configured to detect a temperature of the OLED unit 221, and outputs a voltage value or a resistance value corresponding to the detected temperature as a detection value.

The distance sensor 64 is configured to execute distance detection, and output a signal indicating detection results to the coupling device 10 via the right I/F unit 211. As the distance sensor 64, for example, an infrared ray type depth sensor, an ultrasonic type distance sensor, a Time Of Flight distance sensor, a distance detecting unit configured to combine image detection and sound detection, or the like can be used. Additionally, the distance sensor 64 may be configured to process an image obtained by stereo photographing by a stereo camera or a monocular camera to detect a distance.

The reception unit 213 is configured to receive image data for displaying transmitted from the coupling device 10 via the right I/F unit 211, and output the image data to the OLED unit 221. The OLED unit 221 displays an image based on the image data transmitted by the coupling device 10.

The reception unit 233 is configured to receive image data for displaying transmitted from the coupling device 10 via the left I/F unit 231, and output the image data to the OLED unit 241. Each of the OLED unit 221 and 241 displays an image based on the image data transmitted by the coupling device 10.

The six-axis sensor 235 is a motion sensor including a three-axis acceleration sensor and a three-axis gyro sensor. As the six-axis sensor 235, an Inertial Measurement Unit (IMU) including the above-described sensors as modules may be adopted. The magnetic sensor 237 is a three-axis geomagnetic sensor, for example. A gyro sensor is also referred to as an angular velocity sensor.

Each of the six-axis sensor 235 and the magnetic sensor 237 corresponds to an example of a "second sensor". In other words, each of a three-axis acceleration sensor, a three-axis gyro sensor, and a three-axis geomagnetic sensor corresponds to an example of the "second sensor".

In the present exemplary embodiment, a case in which the "second sensor" is the magnetic sensor 237 will be described.

The temperature sensor 239 is configured to detect a temperature of the OLED unit 241, and output a voltage value or a resistance value corresponding to the detected temperature as a detection value.

Each component of the image display unit 20 operates with power supplied from the coupling device 10 via the coupling cable 40.

The image display unit 20 includes a power source 229 on the right display unit 22, and a power source 249 on the left display unit 24. The power source 229 is configured to distribute and supply the power supplied by the coupling device 10 via the coupling cable 40 to each part of the right display unit 22 including the right display unit substrate 210. Similarly, the power source 249 is configured to distribute and supply the power supplied by the coupling device 10 via the coupling cable 40 to each part of the left display unit 24 including the left display unit substrate 230. The right display unit 22 and the left display unit 24 may include a conversion circuit or the like configured to convert a voltage.

The coupling device 10 includes an I/F unit 110, the second control unit 120, a sensor control unit 122, a display control unit 124, a power control unit 126, a non-volatile storage unit 130, an operation unit 140, a coupling portion 145, and a sound processing unit 147.

The I/F unit 110 includes the connector 11D. Further, the I/F unit 110 includes interface circuits coupled to the connector 11D and configured to execute communication protocols conforming to respective communication standards.

The I/F unit 110 may be, for example, an interface substrate on which the connector 11D and the interface circuits are mounted. Further, a configuration may be adopted in which the second control unit 120, the sensor control unit 122, the display control unit 124, and the power control unit 126 of the coupling device 10 are mounted on a coupling device main substrate (not illustrated). In this case, on the coupling device main substrate, the connector 11D of the I/F unit 110 and the interface circuit may be mounted.

Additionally, the I/F unit 110 may include, for example, an interface for a memory card capable of being coupled to an external storage device or an external storage medium, or the like, or the I/F unit 110 may be configured by a wireless communication interface.

The second control unit 120 is configured to control each part of the coupling device 10. The second control unit 120 includes a processor such as a central processing unit (CPU). The second control unit 120 causes the processor to execute a control program to control each component of the HMD 100 in cooperation of software and hardware. The second control unit 120 is coupled to the non-volatile storage unit 130, the operation unit 140, the coupling portion 145, and the sound processing unit 147.

The sensor control unit 122 is configured to control the camera 61, the distance sensor 64, the illuminance sensor 65, the temperature sensor 217, the six-axis sensor 235, the magnetic sensor 237, and the temperature sensor 239. Specifically, the sensor control unit 122 is configured to perform setting and initialization of a sampling period of each sensor according to control of the second control unit 120, and execute energization to each sensor, transmission of control data, acquisition of detection values and the like, in correspondence to the sampling period of each sensor.

The sensor control unit 122 is coupled to the connector 11D of the I/F unit 110, and is configured to output the data regarding the detection value acquired from each sensor to the connector 11D at a preset timing. The smartphone 300 coupled to the connector 11D can acquire the detection value of each sensor of the HMD 100, the imaging data of the camera 61, and the data indicating the line-of-sight direction detected by the inner camera 68.

The display control unit 124 is configured to execute various kinds of processing for the image display unit 20 to display an image based on image data input to the I/F unit 110. In the present exemplary embodiment, an image signal output by the smartphone 300 is input to the connector 11D. The image signal is digital image data, but may be an analog image signal.

For example, the display control unit 124 is configured to execute various kinds of processing such as cutting out of a frame, resolution conversion, intermediate frame generation, and frame rate conversion. Resolution conversion includes so-called scaling. The display control unit 124 is configured to output image data corresponding to each of the OLED unit 221, and the OLED unit 241 to the coupling portion 145. The image data input to the coupling portion 145 is transmitted from the connector 11A to the right I/F unit 211 and the left I/F unit 231 as an image signal 201. The image signal 201 is digital image data processed in response to each of the OLED unit 221 and the OLED unit 241.

In the present exemplary embodiment, the connector 11D is configured by a USB-Type C connector. The display control unit 124 receives image data transmitted in USB-Type C alternative mode via the connector 11D.

The sensor control unit 122 and/or the display control unit 124 may be realized by cooperation of software and hardware by a processor executing a program. That is, the sensor control unit 122 and the display control unit 124 are configured by a processor to execute a program to execute the operations described above. In this example, the sensor control unit 122 and the display control unit 124 may be realized by a processor constituting the second control unit 120 executing a program. In other words, the processor may function as the second control unit 120, the display control unit 124 and the sensor control unit 122 by executing the program. Here, the processor can be paraphrased as a computer.

Additionally, each of the display control unit 124 and the sensor control unit 122 may include programmed hardware such as a Digital Signal Processor (DSP) and a Field Programmable Gate Array (FPGA). Additionally, the sensor control unit 122 and the display control unit 124 may be integrated to be constituted as a System-on-a-Chip (SoC)-FPGA.

The power control unit 126 is coupled to the connector 11D. The power control unit 126 is configured to, based on power supplied from the connector 11D, supply power to each component of the coupling device 10 and to the image display unit 20. Additionally, the power control unit 126 may include a voltage conversion circuit (not illustrated) built in, and may be configured to be capable of supplying different voltage to each component of the coupling device 10 and the image display unit 20. The power control unit 126 may be configured of a programmed semiconductor device such as a logic circuit and the FPGA. Further, the power control unit 126 may be configured of hardware common to the sensor control unit 122 and/or the display control unit 124.

Each of the sensor control unit 122, the display control unit 124, and the power control unit 126 may include a work memory for executing data processing, and may execute processing by using a memory of the second control unit 120.

The operation unit 140 is configured to detect an operation on an operated part included in the coupling device 10 and outputs data indicating an operation content or an operation signal indicating the part to be operated to the second control unit 120.

The sound processing unit 147 is configured to generate a sound signal according to sound data that is input from the second control unit 120, and output the sound signal to the coupling portion 145. This sound signal is output from the coupling portion 145 to the right earphone 32 and the left earphone 34 via the audio connector 36. Additionally, the sound processing unit 147 is configured to adjust the volume of the sound signal under the control of the second control unit 120. Additionally, the sound processing unit 147 is configured to generate sound data of the sound collected by the microphone 63, and output the sound data to the second control unit 120. This sound data may be processed in the same manner as the detected value of the sensor included in the image display unit 20 by the second control unit 120.

Additionally, the coupling device 10 may include a rechargeable battery (not illustrated), and may be configured to supply power to each component of the coupling device 10 and the image display unit 20 from this battery. The battery included the coupling device 10 may be a rechargeable secondary battery.

1-4. Configuration of Smartphone

Figure 5:
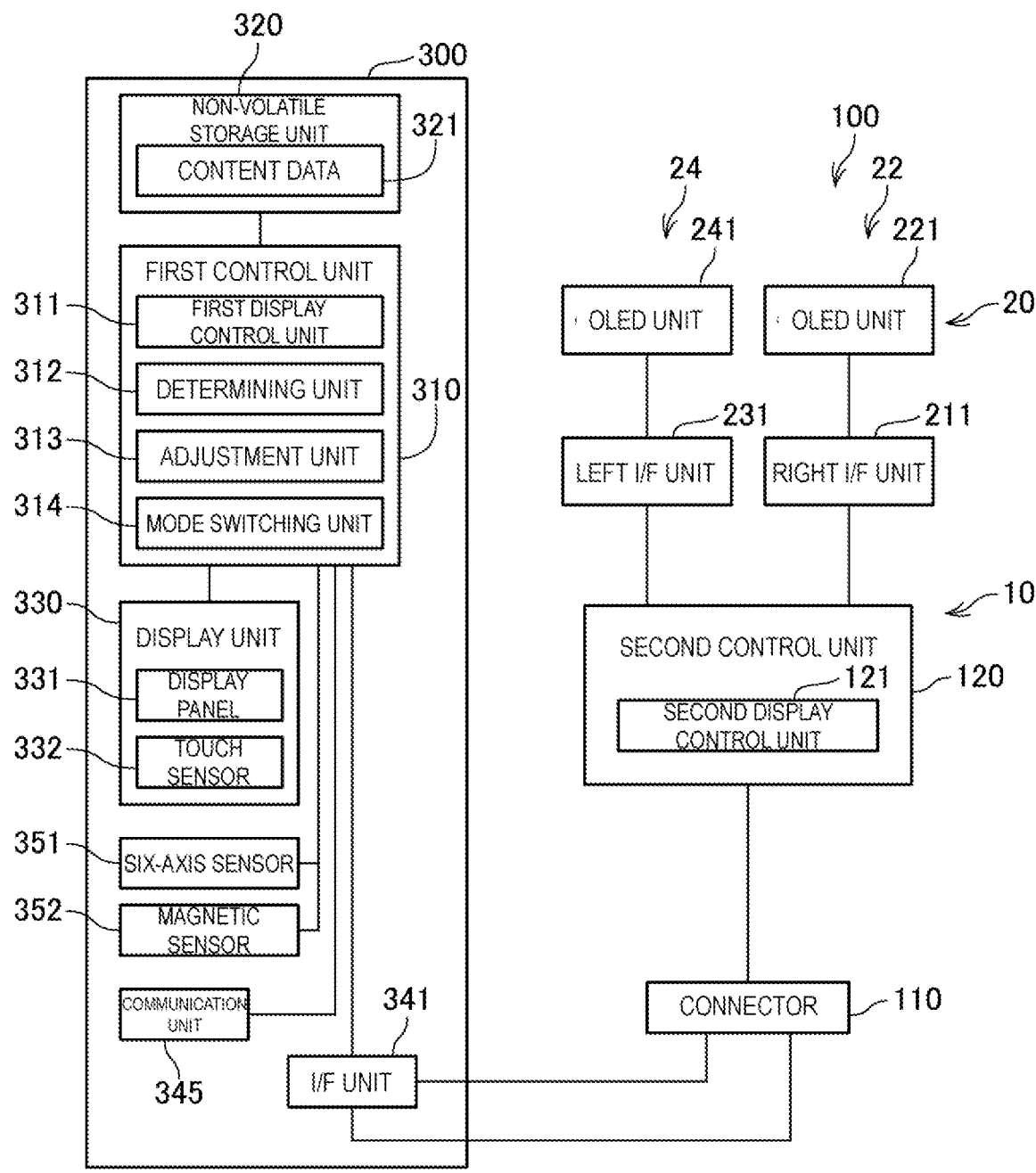
FIG. 5 is a diagram illustrating a configuration of a first control unit of the HMD and a smartphone.

FIG. 5 is a diagram illustrating a configuration of the second control unit 120 of the HMD 100 and the smartphone 300.

The smartphone 300 includes a first control unit 310, a non-volatile storage unit 320, a display unit 330, an I/F unit 341, a communication unit 345, a six-axis sensor 351, and a magnetic sensor 352. The first control unit 310 includes a processor such as a CPU or a microcomputer, and this processor is configured to execute a control program to control each component of the smartphone 300. The first control unit 310 may include a memory such as a read only memory (ROM) configured to store in a non-volatile manner a control program executed by the processor and a random access memory (RAM) constituting a work area of the processor. The processor corresponds to an example of the "computer". The control program stored in the memory of the first control unit 310 corresponds to an example of the "control program".

The non-volatile storage unit 320 is configured to store, in a non-volatile manner, a control program to be executed by the first control unit 310 and data to be processed by the first control unit 310. The non-volatile storage unit 130 is, for example, a magnetic recording device such as a Hard Disk Drive (HDD), or is a storage device using a semiconductor storage element such as a flash memory.

The non-volatile storage unit 320 is configured to store, for example, content data 321 of contents including an image. The content data 321 is a file in a format that the first control unit 310 can process, and includes image data, and may include sound data.

Additionally, the non-volatile storage unit 320 is configured to store an Operating System (OS) as a basic control program executed by the first control unit 310, an application program operating by using the OS as a platform, and the like. Additionally, the non-volatile storage unit 320 is configured to store data processed during execution of the application program, data of processing results, and the like.

A display panel 331, and a touch sensor 332 provided in the display unit 330 are coupled with the first control unit 310. The display panel 331 is configured to display various images based on control of the first control unit 310. The display panel 331 is constituted by a Liquid Crystal Display (LCD), for example. The display panel 331 is configured in a rectangular shape. In the present exemplary embodiment, the display panel 331 has a rectangular shape.

The touch sensor 332 is configured to detect a touch operation and output data indicating the detected operation to the first control unit 310. The touch sensor 332 is integrally formed with the display panel 331. Specifically, the touch sensor 332 is formed at an image display surface of the display panel 331. In the present exemplary embodiment, the touch sensor 332 has a rectangular shape. The data output by the touch sensor 332 is coordinate data indicating an operating position in the touch sensor 332, or the like. The touch sensor 332 corresponds to an example of the "position input unit".

In the present exemplary embodiment, the touch sensor 332 outputs first coordinate data DA1 indicating absolute coordinates and second coordinate data DA2 indicating relative coordinates.

The first coordinate data DA1 indicates absolute coordinates of a position of a touch operation. In an initial state, for example, an X-axis is set along a long side direction of the touch sensor 332, and a Y-axis is set along a short side direction of the touch sensor 332. The long side direction of the touch sensor 332 coincides with a long side direction of the display panel 331, and the short side direction of the touch sensor 332 coincides with a short side direction of the display panel 331. The first coordinate data DA1 is constituted of an X coordinate indicating a position in an X-axis direction of the touch operation, and a Y coordinate indicating a position in a Y-axis direction of the touch operation.

The second coordinate data DA2 indicates relative coordinates of displacement of the touch operation. In other words, the second coordinate data DA2 indicates displacement from a position of a starting point of the touch operation to a position of the touch operation after movement. In the initial state, for example, the X-axis is set along the long side direction of the touch sensor 332, and the Y-axis is set along the short side direction of the touch sensor 332. The second coordinate data DA2 is constituted of an X coordinate indicating displacement of the position in the X-axis direction of the touch operation, and a Y coordinate indicating displacement of the position in the Y-axis direction of the touch operation.

The I/F unit 341 is an interface coupled with an external device. The I/F unit 341 is configured to execute communication compliant with, for example, a standard such as an HDMI interface and a USB interface. The I/F unit 341 includes a connector to be coupled to the USB cable 46, an interface circuit configured to process a signal transmitted via the connector. The I/F unit 341 is an interface substrate including the connector and the interface circuit, and is coupled with a main substrate on which a processor and the like of the first control unit 310 are mounted. Alternatively, the connector and the interface circuit constituting the I/F unit 341 are mounted on a main substrate of the smartphone 300. The I/F unit 341 corresponds to an example of the "coupling portion".

In the present exemplary embodiment, the I/F unit 341 includes a USB interface, and is coupled with the connector 11D via the USB cable 46. For example, the first control unit 310 is configured to output image data via the USB cable 46, and receive data about an output value of a sensor and the like from the coupling device 10.

Additionally, the I/F unit 341 may be a radio communication interface. In this case, the I/F unit 341 can be an interface substrate on which a communication circuit including a Radio Frequency (RF) unit is mounted, or can be a circuit mounted on a main substrate.

The communication unit 345 is a communication interface configured to execute data communication with an external device. The communication unit 345 may be a wired communication interface capable of being coupled with a cable, or may be a radio communication interface. For example, the communication unit 345 may be a wired LAN interface supporting Ethernet (registered trademark), or a wireless LAN interface supporting IEEE802.11 standards.

The communication unit 345 is, for example, a communication interface that connects to another smartphone via a wireless telephone line.

The six-axis sensor 351 is a motion sensor including a three-axis acceleration sensor and a three-axis gyro sensor. The six-axis sensor 351 may adopt an IMU in which the sensors described above are provided as a module. The magnetic sensor 352 is a three-axis geomagnetic sensor, for example. A gyro sensor is also referred to as an angular velocity sensor.

Each of the six-axis sensor 351 and the magnetic sensor 352 corresponds to an example of a "first sensor". In other words, each of the three-axis acceleration sensor, the three-axis gyro sensor, and the three-axis geomagnetic sensor corresponds to an example of the "first sensor".

In the present exemplary embodiment, a case in which the "first sensor" is the magnetic sensor 352 will be described.

The first control unit 310 includes a first display control unit 311, a determining unit 312, an adjustment unit 313, and a mode switching unit 314. Specifically, the first control unit 310 functions as the first display control unit 311, the determining unit 312, the adjustment unit 313, and the mode switching unit 314 by executing the control program by the processor included in the first control unit 310.

The first display control unit 311 replays the content data 321, and displays an image PT corresponding to image data included in the content data 321 on the display panel 331 of the display unit 330.

The first display control unit 311 reduces brightness of the display panel 331 of the display unit 330, depending on whether the HMD 100 is coupled to the I/F unit 341 or not. Specifically, when the HMD 100 is coupled to the I/F unit 341, the first display control unit 311 reduces the brightness of the display panel 331 of the display unit 330 to be lower in comparison to a case where the HMD 100 is not coupled to the I/F unit 341.

For example, when the HMD 100 is not coupled to the I/F unit 341, the first display control unit 311 turns brightness of the image PT displayed on the display unit 330 into set brightness. When the HMD 100 is coupled to the I/F unit 341, the first display control unit 311 reduces the brightness of the image PT displayed on the display unit 330 to be lower than the set brightness.

More specifically, the first display control unit 311 reduces the brightness of the image PT displayed on the display panel 331, by superimposing an image with certain concentration on the image PT. The "image with certain concentration" may be described in the following description as a "dark image". The "dark image" is specifically an image with certain concentration in gray. In other words, by virtually overlapping a layer in which the dark image is formed at an upper layer of the image PT displayed on the display panel 331, the first display control unit 311 reduces the brightness of the image PT displayed on the display panel 331.

The image PT includes a pointer object PB. Specifically, when the HMD 100 is coupled to the I/F unit 341, the first display control unit 311 displays the pointer object PB on the display panel 331. When the HMD 100 is not coupled to the I/F unit 341, the first display control unit 311 does not display the pointer object PB on the display panel 331. The pointer object PB indicates a position of a pointer. The pointer object PB is, for example, an object such as an arrow, and points a tip of the arrow.

The first display control unit 311 displays the pointer object PB at a position P1 or a position P2, when the HMD 100 is coupled to the I/F unit 341. The position P1 indicates a default position on the display panel 331. The position P2 indicates a position at which the pointer object PB is hidden on the display panel 331.

The position P1 is, for example, a central position on the display panel 331. The position P1 is, for example, any of four corners of the display panel 331. The position P1 may be configured to be configurable by a user.

The position P2 corresponds to the position of the pointer object PB when a state in which the HMD 100 is coupled to the I/F unit 341 transits to a state in which the HMD 100 is not coupled to the I/F unit 341.

Based on detection results of the camera 61 and the inner camera 68, the determining unit 312 determines whether the smartphone 300 is present within a visual field of the user. The camera 61 captures a wider range of outside scene images than the visual field of the user. The inner camera 68 detects the line-of-sight direction of the user.

The determining unit 312 first acquires from the HMD 100 outside scene image data captured by the camera 61, and extracts an outside scene image that is present within the visual field of the user, from the outside scene images captured by the camera 61. Note that, the visual field of the user is determined based on the line-of-sight direction of the user detected by the inner camera 68. Then, the determining unit 312 determines whether the smartphone 300 is included in the extracted outside scene image or not. Note that, the determination of whether the smartphone 300 is included in the extracted outside scene image or not is performed using, for example, image processing or the like.

In the present exemplary embodiment, the determining unit 312 determines whether the smartphone 300 is present within the visual field of the user, based on the detection results of the camera 61 and the inner camera 68, but the present disclosure is not limited thereto. It is sufficient that the determining unit determines whether the smartphone 300 is present within the visual field of the user, based on the detection result of at least one of the camera 61 and the inner camera 68. In other words, the "third sensor" includes at least one of the camera 61 and the inner camera 68. In the present exemplary embodiment, a description will be given of a case in which the "third sensor" includes the camera 61 and the inner camera 68.

The adjustment unit 313 adjusts an orientation of coordinate axes set on the touch sensor 332, based on a detection result of the magnetic sensor 352. The magnetic sensor 352 detects an orientation of the touch sensor 332. The coordinate axes set on the touch sensor 332 are constituted by an X-axis and a Y-axis.

The adjustment unit 313 adjusts the orientation of the coordinate axes set on the touch sensor 332, based on a detection result of the magnetic sensor 237 of the HMD 100. The magnetic sensor 237 detects an orientation of the image display unit 20. In other words, the magnetic sensor 237 detects orientations of the half mirror 261 and the half mirror 281 illustrated in FIG. 3.

The adjustment unit 313 adjusts the orientation of the coordinate axes set on the touch sensor 332 in a stepwise manner. For example, the orientation of the coordinate axes is adjusted in a stepwise manner in steps of 30 degrees.

Furthermore, the adjustment unit 313 adjusts the orientation of the coordinate axes set on the touch sensor 332, based on a determination result of the determining unit 312. Specifically, when the determining unit 312 determines that the smartphone 300 is present within the visual field of the user, the adjustment unit 313 adjusts the orientation of the coordinate axes set on the touch sensor 332. When the determining unit 312 determines that the smartphone 300 is not present within the visual field of the user, the adjustment unit 313 regulates the adjustment of the orientation of the coordinate axes set on the touch sensor 332. In the present exemplary embodiment, when the determining unit 312 determines that the smartphone 300 is not present within the visual field of the user, the adjustment unit 313 prohibits the adjustment of the orientation of the coordinate axes set on the touch sensor 332.

The mode switching unit 314 is capable of executing a first mode MD1 and a second mode MD2, and switches between the first mode MD1 and the second mode MD2 and executes the mode, in accordance with whether the HMD 100 is coupled to the I/F unit 341 or not. Specifically, when the HMD 100 is not coupled to the I/F unit 341, the mode switching unit 314 executes the first mode MD1. In addition, when the HMD 100 is coupled to the I/F unit 341, the mode switching unit 314 executes the second mode MD2.

In the first mode MD1, input detected by the touch sensor 332 is accepted as an input in absolute coordinates. In other words, in the first mode MD1, the first coordinate data DA1 is accepted from the touch sensor 332. The first coordinate data DA1 indicates absolute coordinates of a position of a touch operation. In the second mode MD2, input detected by the touch sensor 332 is accepted as an input in relative coordinates. In other words, in the second mode MD2, the second coordinate data DA2 is accepted from the touch sensor 332. The second coordinate data DA2 indicates relative coordinates of displacement of the touch operation.

Processing of the first control unit 310 will be specifically described with reference to FIG. 6 to FIG. 9.

In the present exemplary embodiment, image data that the smartphone 300 outputs to the coupling device 10 is image data corresponding to an image that the smartphone 300 displays by the display panel 331 of the display unit 330. In other words, the first display control unit 311 causes the image display unit 20 of the HMD 100 to display the image displayed by the display panel 331. In this case, the image display unit 20 of the HMD 100 displays an identical image to the image displayed on the display panel 331, and performs so-called "mirroring display".

1-5. Configuration of Second Control Unit of HMD

The second control unit 120 of the HMD 100 includes a second display control unit 121. Specifically, the second control unit 120 functions as the second display control unit 121, by the processor included in the second control unit 120 executing the control program.

The second display control unit 121 receives an image from the smartphone 300 in accordance with an instruction from the first display control unit 311, and causes the image display unit 20 to display the received image.

Specifically, the second display control unit 121 generates a right image and a left image, from the image received from the smartphone 300. Then, the second display control unit 121 causes the right display unit 22 to display the right image and the left display unit 24 to display the left image.

More specifically, the second display control unit 121 transmits the right image to the OLED unit 221 via the right I/F unit 211, and causes the OLED unit 221 to display the right image. The second display control unit 121 transmits the left image to the OLED unit 241 via the left I/F unit 231, and causes the OLED unit 241 to display the left image.

2. Description of Processing of First Control Unit of Smartphone Using Specific Examples Each of FIG. 6 to FIG. 9 is a diagram illustrating a specific example of processing of the first control unit 310. Note that, in FIG. 6 to FIG. 9, a case in which the HMD 100 is coupled to the I/F unit 341 will be described.

2-1. Description of Processing of Adjustment Unit

Figure 6:
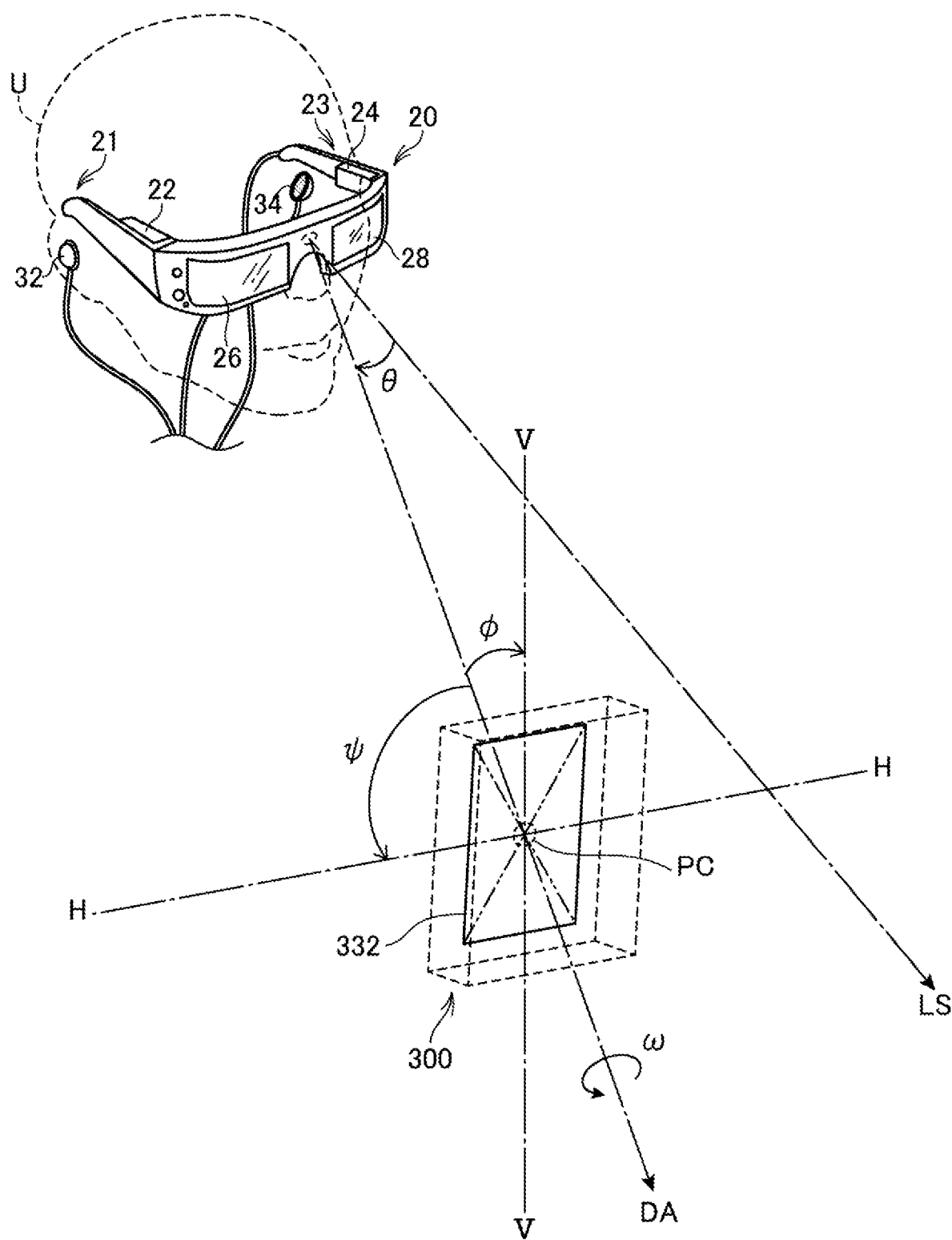
FIG. 6 is a diagram illustrating an orientation of a touch sensor of the smartphone with respect to the HMD.

FIG. 6 is a diagram illustrating an orientation of the touch sensor 332 of the smartphone 300 with respect to the HMD 100.

As illustrated in FIG. 6, when a user operates the smartphone 300, the smartphone 300 is typically placed in a line-of-sight direction LS of the user. The direction LS indicates the line-of-sight direction of the user. A direction DA indicates a direction from the HMD 100 towards a central position PC of the touch sensor 332 of the smartphone 300.

The direction DA is inclined with respect to the direction LS by an inclination angle θ. The inclination angle θ indicates the inclination angle of the direction DA with respect to the direction LS.

A line V-V indicates a vertical direction. A line H-H indicates a horizontal direction. In FIG. 6, a case in which a plane including the touch sensor 332 includes the line V-V and the line H-H will be described. That is, a long side direction of the touch sensor 332 is parallel to the line V-V, and a short side direction of the touch sensor 332 is parallel to the line H-H.

The direction DA is inclined with respect to the line V-V by an inclination angle φ. The inclination angle φ indicates the inclination angle of the direction DA with respect to the line V-V.

Furthermore, the direction DA is inclined with respect to the line H-H by an inclination angle ψ. The inclination angle ψ indicates the inclination angle of the direction DA with respect to the line H-H. The inclination angle φ and the inclination angle ψ define a direction of the central position PC of the touch sensor 332 with respect to the user or the HMD 100.

The touch sensor 332 of the smartphone 300 is rotatable in the plane that includes the line V-V and the line H-H. An inclination angle ω indicates an inclination angle of the long side direction of the touch sensor 332 with respect to the line V-V in the plane that includes the line V-V and the line H-H. In FIG. 6, a state in which the inclination angle ω is zero is illustrated.

Figure 7:
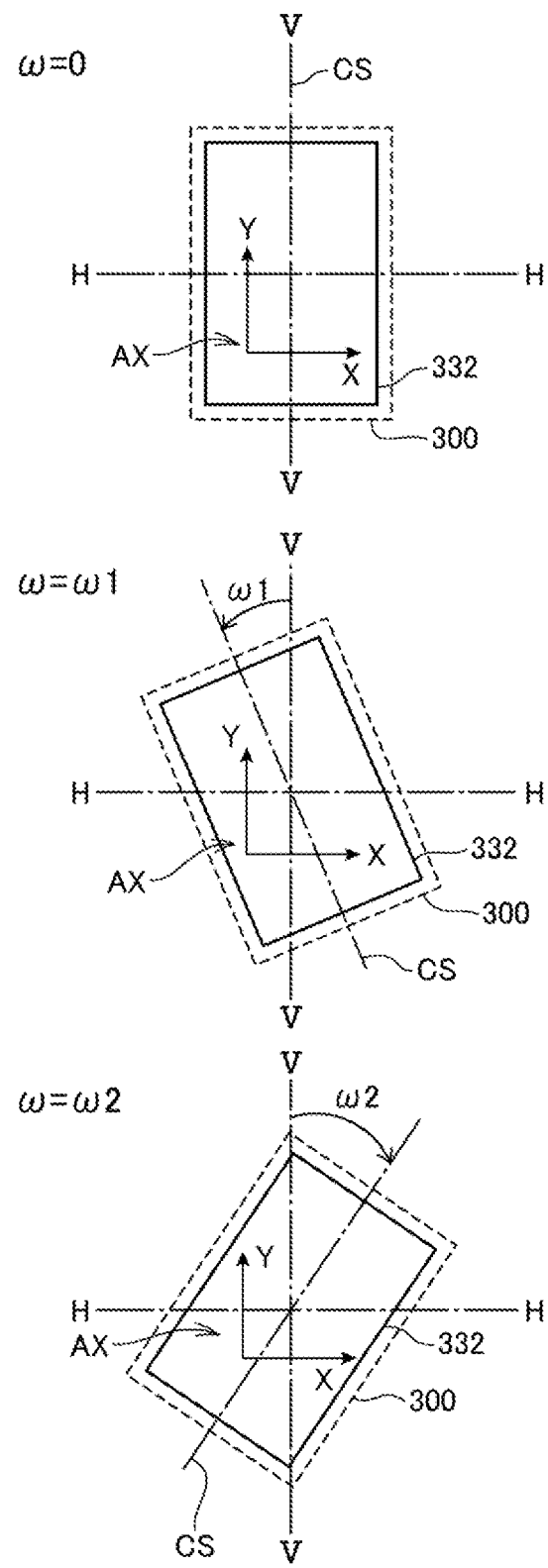
FIG. 7 is a diagram illustrating an example of a method for adjusting an orientation of a coordinate axis of the touch sensor.

FIG. 7 is a diagram illustrating an example of a method for adjusting an orientation of coordinate axes AX of the touch sensor 332 by the adjustment unit 313. The coordinate axes AX are constituted by an X-axis and a Y-axis. The adjustment unit 313 adjusts the orientation of the coordinate axes AX, based on a detection result of the magnetic sensor 352.

A diagram at an upper stage of FIG. 7 illustrates a state in which the inclination angle ω is zero. When the inclination angle ω is zero, a long side direction CS of the touch sensor 332 is parallel to the line V-V. In this case, the X-axis constituting the coordinate axes AX is parallel to the line H-H, and the Y-axis constituting the coordinate axes AX is parallel to the line V-V.

Specifically, an orientation of a positive direction of the Y-axis constituting the coordinate axes AX is an upward direction of the vertical direction indicated by the line V-V. Additionally, an orientation of a positive direction of the X-axis constituting the coordinate axes AX is an orientation rotated clockwise by 90 degrees with respect to the orientation of the positive direction of the Y-axis of the horizontal direction indicated by the line H-H.

In this case, the orientation of the coordinate axes AX adjusted by the adjustment unit 313 matches the orientation of the coordinate axes AX set in a normal state. Note that, the orientation of the coordinate axes AX set in the normal state indicates an orientation of the coordinate axes AX set in a default state.

A diagram at a middle stage of FIG. 7 illustrates a state in which the inclination angle ω is an inclination angle ω1. The inclination angle ω1 indicates a state in which the long side direction CS is inclined counterclockwise with respect to the line V-V.

Specifically, the adjustment unit 313 sets the orientation of the X-axis constituting the coordinate axes AX to an orientation parallel to the line H-H, and sets the orientation of the Y-axis constituting the coordinate axes AX to an orientation parallel to the line V-V.

More specifically, the adjustment unit 313 sets the orientation of the positive direction of the Y-axis constituting the coordinate axes AX to the upward direction of the vertical direction indicated by the line V-V. Additionally, the adjustment unit 313 sets the orientation of the positive direction of the X-axis constituting the coordinate axes AX to an orientation rotated clockwise by 90 degrees with respect to the orientation of the positive direction of the Y-axis of the horizontal direction indicated by the line H-H.

A diagram at a lower stage of FIG. 7 illustrates a state in which the inclination angle ω is an inclination angle ω2. The inclination angle ω2 indicates a state in which the long side CS is inclined clockwise with respect to the line V-V. The adjustment unit 313 adjusts the orientation of the coordinate axes AX, based on the detection result of the magnetic sensor 352.

Specifically, the adjustment unit 313 sets the orientation of the X-axis constituting the coordinate axes AX to the orientation parallel to the line H-H, and sets the orientation of the positive direction of the Y-axis constituting the coordinate axes AX to the orientation parallel to the line V-V.

More specifically, the adjustment unit 313 sets the orientation of the positive direction of the Y-axis constituting the coordinate axes AX to the upward direction of the vertical direction indicated by the line V-V. Additionally, the adjustment unit 313 sets the orientation of the positive direction of the X-axis constituting the coordinate axes AX to the orientation rotated clockwise by 90 degrees with respect to the orientation of the positive direction of the Y-axis of the horizontal direction indicated by the line H-H.

In this manner, even when the inclination angle ω changes, the orientation of the positive direction of the Y-axis constituting the coordinate axes AX is set to the upward direction of the vertical direction, and the orientation of the positive direction of the X-axis constituting the coordinate axes AX is set to the orientation rotated clockwise by 90 degrees with respect to the orientation of the positive direction of the Y-axis. Accordingly, operability for the touch sensor 332 by the user can be improved.

Figure 8:
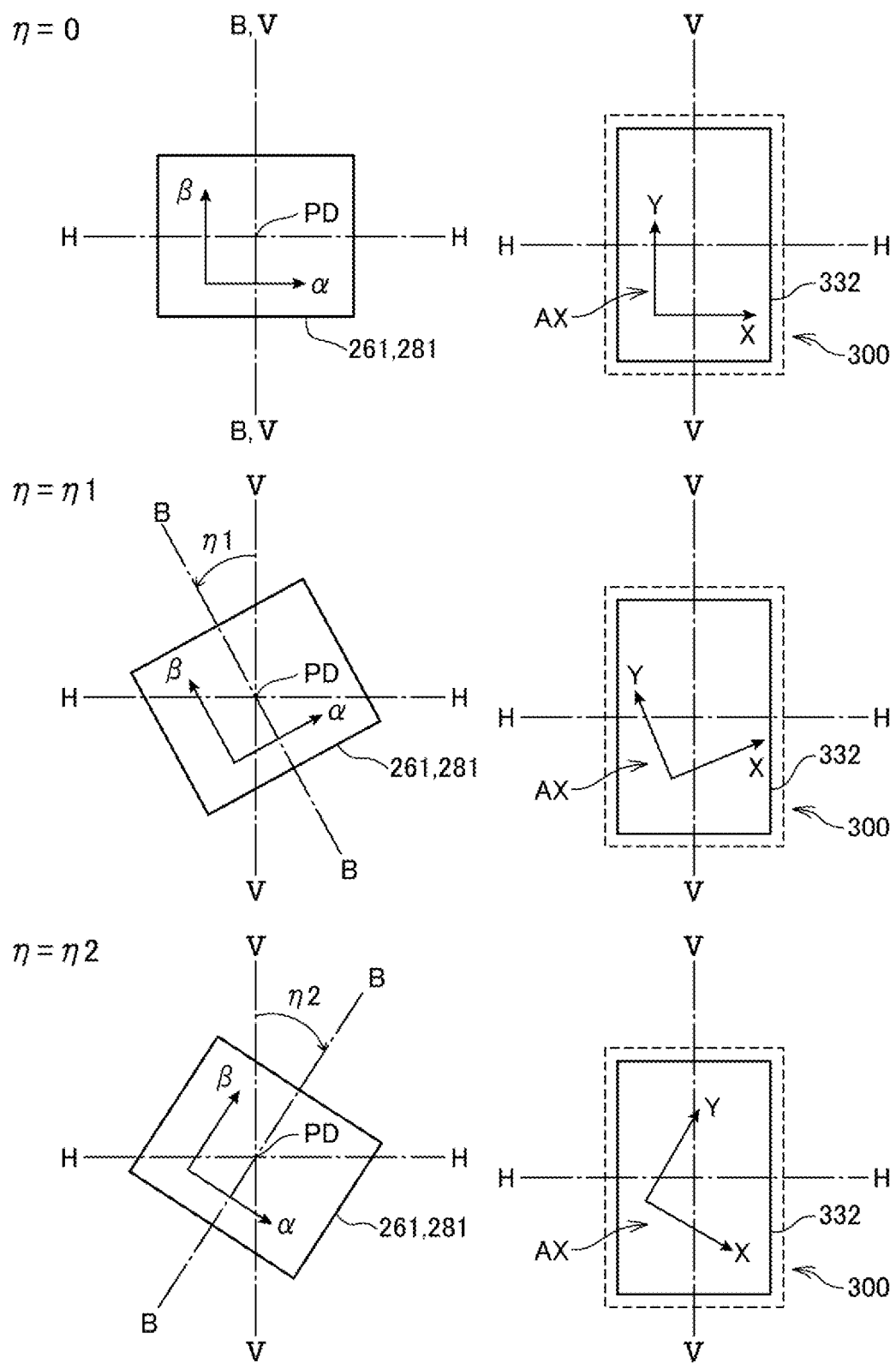
FIG. 8 is a diagram illustrating another example of the method for adjusting the orientation of the coordinate axis of the touch sensor.

FIG. 8 is a diagram illustrating another example of the method for adjusting the orientation of the coordinate axes AX of the touch sensor 332 by the adjustment unit 313. The coordinate axes AX are constituted by the X-axis and the Y-axis. The adjustment unit 313 adjusts the orientation of the coordinate axes AX based on the detection result of the magnetic sensor 237 of the HMD 100.

Diagrams at an upper stage of FIG. 8 illustrate a state in which an inclination angle η is zero. The inclination angle η indicates an inclination angle of the line B-B with respect to the line V-V. The line V-V indicates the vertical direction. The line B-B indicates the center line extending in the up and down direction of each of the half mirror 261 and the half mirror 281.

As illustrated in a left diagram at the upper stage of FIG. 8, when the inclination angle η is zero, the line B-B is parallel to the line V-V. The line H-H indicates the horizontal direction.

Note that, in the left diagram at the upper stage, a left diagram at a middle stage, and a left diagram at a lower stage of FIG. 8, the line V-V and the line H-H line are described as passing through a central position PD of the half mirror 261 and the half mirror 281.

A right diagram at the upper stage of FIG. 8 illustrates the orientation of the coordinate axes AX of the touch sensor 332 when the inclination angle η is zero. When the inclination angle η is zero, the X-axis constituting the coordinate axes AX is parallel to the line H-H, and the Y-axis constituting the coordinate axes AX is parallel to the line V-V. In this case, the orientation of the coordinate axes AX adjusted by the adjustment unit 313 matches the orientation of the coordinate axes AX set in the normal state.

Specifically, the orientation of the positive direction of the Y-axis constituting the coordinate axes AX is the upward direction of the vertical direction indicated by the line V-V. Additionally, the orientation of the positive direction of the X-axis constituting the coordinate axes AX is the orientation rotated clockwise by 90 degrees with respect to the orientation of the positive direction of the Y-axis in the horizontal direction indicated by the line H-H.

The left diagram at the middle stage of FIG. 8 illustrates a state in which the inclination angle η is an inclination angle η1. The inclination angle η1 indicates a state in which the line B-B is inclined counterclockwise with respect to the line V-V.

A right diagram at the middle stage of FIG. 8 illustrates the orientation of the coordinate axes AX of the touch sensor 332, when the inclination angle η is the inclination angle η1. When the inclination angle η is the inclination angle η1, the adjustment unit 313 sets the Y-axis constituting the coordinate axes AX to an orientation inclined counterclockwise with respect to the line V-V by the inclination angle η1.

Specifically, the adjustment unit 313 sets the orientation of the positive direction of the Y-axis constituting the coordinate axes AX to an orientation inclined counterclockwise with respect to the upward direction of the vertical direction indicated by the line V-V by the inclination angle η1. Additionally, the adjustment unit 313 sets the orientation of the positive direction of the X-axis constituting the coordinate axes AX to an orientation rotated clockwise by 90 degrees with respect to the positive direction of the Y-axis.

The left diagram at the lower stage of FIG. 8 illustrates a state in which the inclination angle η is an inclination angle η2. The inclination angle η2 indicates a state in which the line B-B is inclined clockwise with respect to the line V-V.

A right diagram at the lower stage of FIG. 8 illustrates the orientation of the coordinate axes AX of the touch sensor 332, when the inclination angle η is the inclination angle η2. When the inclination angle η is the inclination angle η2, the adjustment unit 313 sets the Y-axis constituting the coordinate axes AX to an orientation inclined clockwise with respect to the line V-V by the inclination angle η2.

Specifically, the adjustment unit 313 sets the orientation of the positive direction of the Y-axis constituting the coordinate axes AX to an orientation inclined clockwise with respect to the upward direction of the vertical direction indicated by the line V-V by the inclination angle η2. Additionally, the adjustment unit 313 sets the orientation of the positive direction of the X-axis constituting the coordinate axes AX to the orientation rotated clockwise by 90 degrees with respect to the orientation of the positive direction of the Y-axis.

In this manner, even when the inclination angle η changes, the orientation of the positive direction of the Y-axis constituting the coordinate axes AX is set to an orientation corresponding to an upward direction of a center line extending in the up and down direction of each of the half mirror 261 and the half mirror 281. Additionally, the orientation of the positive direction of the X-axis constituting the coordinate axes AX is set to the orientation rotated clockwise by 90 degrees with respect to the orientation of the positive direction of the Y-axis. Accordingly, the operability for the touch sensor 332 by the user can be improved.

2-2. Description of Operation in Relative Coordinates

Figure 9:
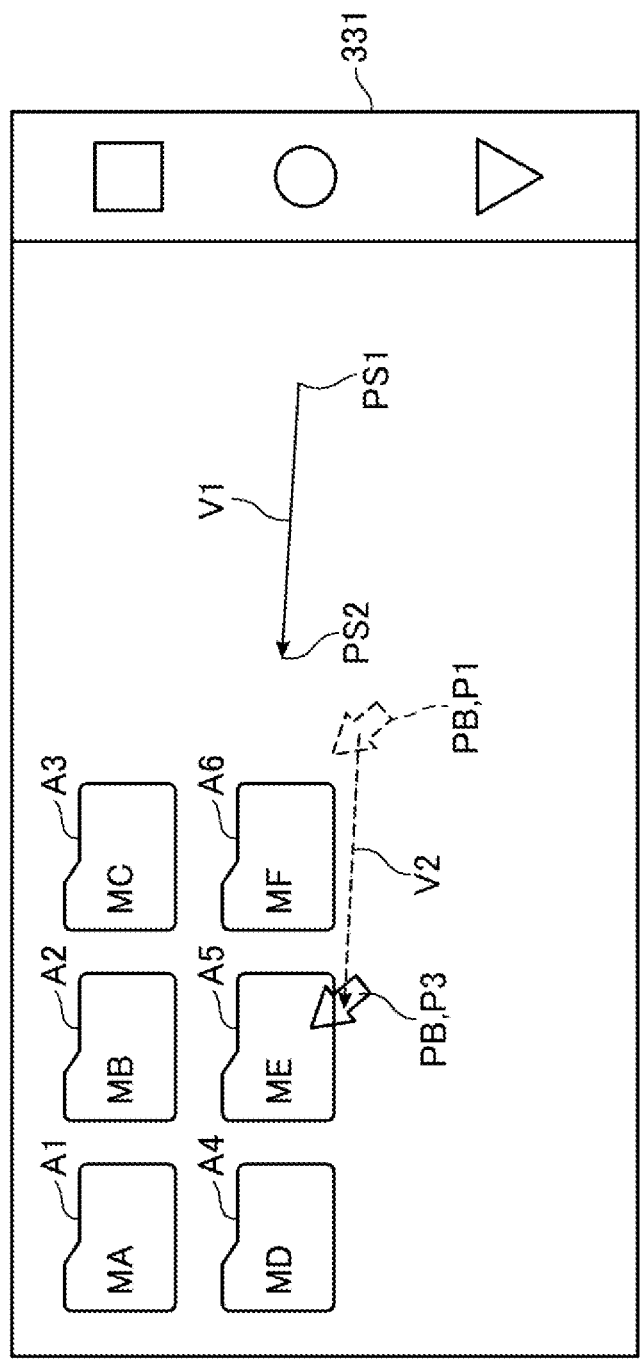
FIG. 9 is a screen view illustrating an example of operation by a pointer object.

FIG. 9 is a screen view illustrating an example of an operation using the pointer object PB in relative coordinates.

Because the HMD 100 is coupled to the I/F unit 341, the mode switching unit 314 executes the second mode MD2. In other words, the mode switching unit 314 accepts input detected by the touch sensor 332 as an input in the relative coordinates.

In addition, because the HMD 100 is coupled to the I/F unit 341, the first display control unit 311 displays the pointer object PB on the display panel 331 of the display unit 330.

As illustrated in FIG. 9, an icon A1, an icon A2, an icon A3, an icon A4, an icon A5, an icon A6, and the pointer object PB are displayed on the display panel 331 by the first display control unit 311.

Each of the icon A1 to icon A6 is associated with the content data 321 stored in the non-volatile storage unit 320. Specifically, the content data 321 includes content data MA, content data MB, content data MC, content data MD, content data ME, and content data MF. The icon A1 is associated with the content data MA, the icon A2 is associated with the content data MB, and the icon A3 is associated with the content data MC. Similarly, the icon A4 to icon A6 are associated with the content data MD to the content data MF respectively.

The pointer object PB is displayed at the default position P1 by the first display control unit 311, as indicated by a dashed arrow. The position P1 is the central position of the display panel 331.

Here, a case is described in which a touch operation is started at a position PS1 and the touch operation is ended at a position PS2, by a user. That is, the user touches the position PS1 with the index finger of the right hand, for example, and moves the index finger of the right hand to the position PS2, with the index finger of the right hand touching the touch sensor 332. The user then takes the index finger of the right hand off the touch sensor 332 at the position PS2.

The mode switching unit 314 detects displacement V1 of the touch operation. With this operation, the pointer object PB is moved by the first display control unit 311 by displacement V2. That is, the pointer object PB is moved from the position P1 to a position P3 on the display panel 331. Note that, an orientation and a length of the displacement V2 are identical to those of the displacement V1.

In the position P3, the pointer object PB points to the icon A5. In this way, a swipe operation from the position PS1 to the position PS2 selects the icon A5. As a result, the first control unit 310 performs replay of the content data ME associated with the icon A5, for example.

In the present exemplary embodiment, the case in which the icon is associated with the content data has been described, but the present disclosure is not limited thereto.

An icon may be associated with a program to perform a function, for example. In this case, the function corresponding to the icon can be performed, by moving the pointer object PB so as to point the icon.

In the present exemplary embodiment, the case in which the icon is displayed on the display panel 331 has been described, but the present disclosure is not limited thereto. It is sufficient that, in addition to the pointer object PB, an object other than the pointer object PB is displayed on the display panel 331. For example, a button object may be displayed on the display panel 331. In this case, by moving the pointer object PB so as to point the button object, a function corresponding to the button object can be performed.

3. Description of Processing of First Control Unit of Smartphone

Figure 10:
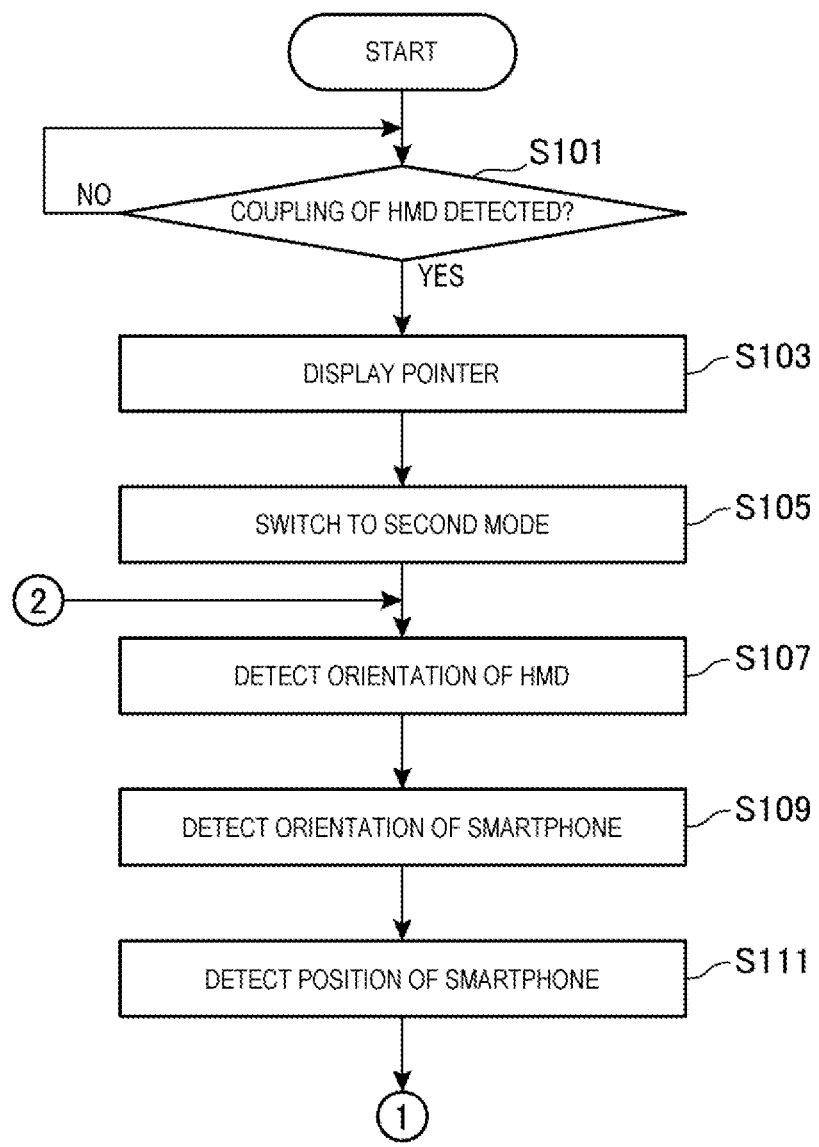
FIG. 10 is a flowchart illustrating processing of the first control unit of the smartphone.
Figure 11:
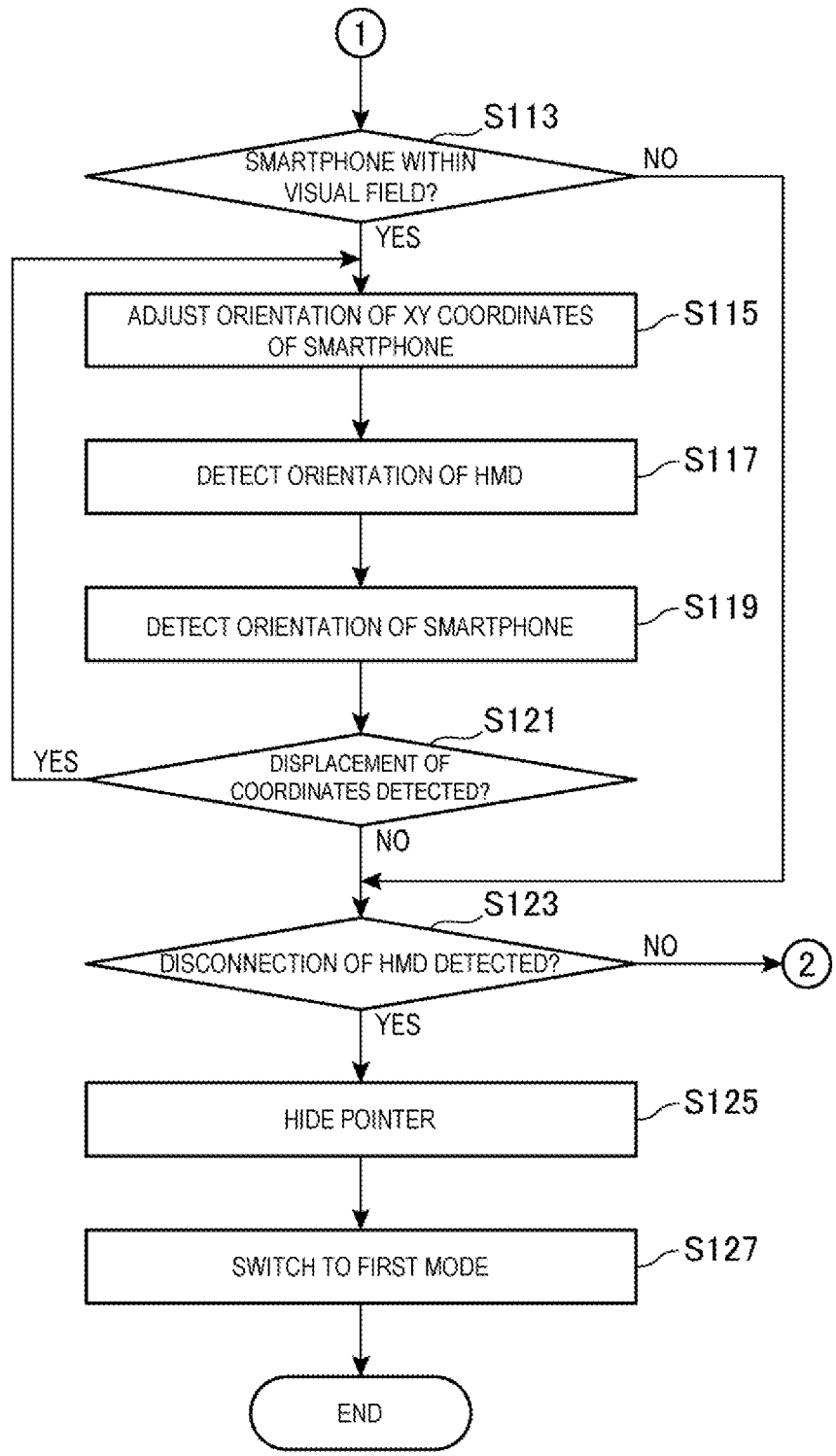
FIG. 11 is a flowchart illustrating processing of the first control unit of the smartphone.

Each of FIG. 10 and FIG. 11 is a flowchart illustrating processing of the first control unit 310 of the smartphone 300.

First, as illustrated in FIG. 10, in step S101, the first control unit 310 determines whether the HMD 100 is coupled to the I/F unit 341 or not.

When the first control unit 310 determines that the HMD 100 is not coupled to the I/F unit 341 (step S101: NO), the processing is brought into a waiting state. When the first control unit 310 determines that the HMD 100 is coupled to the I/F unit 341 (step S101: YES), the processing proceeds to step S103.

Then, in step S103, the first display control unit 311 displays the pointer object PB at the default position P1 on the display panel 331.

Next, in step S105, the mode switching unit 314 switches from the first mode MD1 to the second mode MD2 to execute the second mode MD2. Specifically, the mode switching unit 314 accepts input detected by the touch sensor 332 as an input in relative coordinates.

Next, in step S107, the first control unit 310 detects an orientation of the HMD 100. Specifically, the first control unit 310 detects orientations of the half mirror 261 and the half mirror 281 of the HMD 100, based on a detection result of the magnetic sensor 237 of the HMD 100.

Next, in step S109, the first control unit 310 detects an orientation of the smartphone 300. Specifically, the first control unit 310 detects an orientation of the touch sensor 332, based on a detection result of the magnetic sensor 352 of the smartphone 300.

Next, in step S111, the first control unit 310 detects a position of the smartphone 300. Specifically, the first control unit 310 detects a position of the smartphone 300 within a visual field of a user, based on a detection result of the camera 61, and a detection result of the inner camera 68.

Next, as illustrated in FIG. 11, in step S113, the determining unit 312 determines whether the smartphone 300 is present within the visual field of the user.

When the determining unit 312 determines that the smartphone 300 is not present within the visual field of the user (step S113: NO), the processing proceeds to step S123. When the determining unit 312 determines that the smartphone 300 is present within the visual field of the user (step S113: YES), the processing proceeds to step S115.

Next, in step S115, the adjustment unit 313 adjusts an orientation of the coordinate axes AX set on the touch sensor 332, based on detection results of the magnetic sensor 352 and the magnetic sensors 237 of the HMD 100.

Next, in step S117, the first control unit 310 detects the orientation of the HMD 100.

Next, in step S119, the first control unit 310 detects the orientation of the smartphone 300.

Next, in step S121, the adjustment unit 313 determines whether or not to adjust the orientation of the coordinate axes AX set on the touch sensor 332. Specifically, the adjustment unit 313 determines whether the orientation of the coordinate axes AX set on the touch sensor 332 is displaced by a threshold angle or more, with respect to the orientation of the coordinate axes AX after adjustment when the adjustment unit 313 adjusts the coordinate axes AX or not. The threshold angle is, for example, 30 degrees.

When the adjustment unit 313 determines that the orientation of the coordinate axes AX set on the touch sensor 332 is displaced by the threshold angle or more, with respect to the orientation of the coordinate axes AX after the adjustment (step S121: YES), the processing returns to step S115. When the adjustment unit 313 determines that the orientation of the coordinate axes AX set on the touch sensor 332 is not displaced by the threshold angle or more, with respect to the orientation of the coordinate axes AX after the adjustment (step S121: NO), the processing proceeds to step S123.

Next, in step S123, the first control unit 310 determines whether coupling between the HMD 100 and the I/F unit 341 is disconnected or not.

When the first control unit 310 determines that the coupling between the HMD 100 and the I/F unit 341 is not disconnected (step S123: NO), the processing returns to step S107 in FIG. 10. When the first control unit 310 determines that the coupling between the HMD 100 and the I/F unit 341 is disconnected (step S123: YES), the processing proceeds to step S125.

Then, in step S125, the first display control unit 311 hides the pointer object PB on the display panel 331.

Next, in step S127, the mode switching unit 314 switches from the second mode MD2 to the first mode MD1 to execute the first mode MD1. Then, the processing is terminated.

Note that, step S107 in FIG. 10 and step S117 in FIG. 11 correspond to an example of a "detection step". Step S115 in FIG. 11 corresponds to an example of an "adjustment step".

4. Effects of Present Exemplary Embodiment

As described above, in the present exemplary embodiment, the display system 1 includes the HMD 100 mounted on the head of the user, and the smartphone 300 to which the HMD 100 is coupled. The smartphone 300 includes the touch sensor 332 that accepts the position input operation and detects the coordinates of the operating position with reference to the set coordinate axes AX, the first sensor that detects the orientation of the touch sensor 332, and the adjustment unit 313 that adjusts the orientation of the coordinate axes AX, based on the detection result of the first sensor. The first sensor is, for example, the magnetic sensor 352.

Accordingly, since the orientation of the coordinate axes AX is adjusted by the adjustment unit 313, the orientation of the coordinate axes AX can be adjusted appropriately. For example, as described with reference to FIG. 7, when the inclination angle $\omega$ changes, the adjustment unit 313 can adjust the orientation of the positive direction of the Y-axis constituting the coordinate axes AX to the upward direction of the vertical direction, and the adjustment unit 313 can adjust the orientation of the positive direction of the X-axis constituting the coordinate axes AX to the orientation rotated clockwise by 90 degrees with respect to the orientation of the positive direction of the Y-axis of the horizontal direction. Thus, the operability for a touch panel by the user can be improved. Note that, the touch panel corresponds to the display unit 330.

The first sensor also includes at least one of an acceleration sensor, a gyro sensor, and a geomagnetic sensor.

Thus, the first sensor can accurately detect the orientation of the touch sensor 332.

The HMD 100 includes the image display unit 20 for displaying an image, and the second sensor for detecting the orientation of the image display unit 20, and the adjustment unit 313 adjusts the orientation of the coordinate axes AX in accordance with the orientation detected by the second sensor. The second sensor is, for example, the magnetic sensor 237.

Thus, the adjustment unit 313 can adjust the orientation of the coordinate axes AX, in accordance with the orientation of the image display unit 20. For example, as described with reference to FIG. 8, the orientation of the coordinate axes AX can be adjusted in accordance with the inclination angle η. The inclination angle η indicates the inclination angle of the line B-B with respect to the line V-V. The line V-V indicates the vertical direction. The line B-B indicates the center line extending in the up and down direction of each of the half mirror 261 and the half mirror 281. Thus, the operability of the touch panel by the user can be improved.

The second sensor also includes at least one of an acceleration sensor, a gyro sensor, and a geomagnetic sensor.

Accordingly, the second sensor can accurately detect the orientation of the image display unit 20.

The smartphone 300 includes the I/F unit 341 capable of coupling the HMD 100, and the mode switching unit 314 capable of executing the first mode for accepting the input detected by the touch sensor 332 as the input in the absolute coordinates on the coordinate axes AX, and the second mode for accepting the input detected by the touch sensor 332 as the input in the relative coordinates on the coordinate axes AX, and switching between the first mode and the second mode in accordance with whether the HMD 100 is coupled to the I/F unit 341 or not, and executing the mode.

Thus, for example, when the HMD 100 is coupled to the I/F unit 341, the mode switching unit 314 can execute the second mode for accepting the input detected by the touch sensor 332 as an input in the relative coordinates on the coordinate axes AX. Thus, the operability of the touch panel by the user can be improved.

When the HMD 100 is not coupled to the I/F unit 341, the mode switching unit 314 executes the first mode, and when the HMD 100 is coupled to the I/F unit 341, the mode switching unit 314 executes the second mode.

Thus, the operability of the touch panel by the user can be improved.

The adjustment unit 313 adjusts the orientation of the coordinate axes AX in a stepwise manner. For example, the orientation of the coordinate axes AX is adjusted stepwise in steps of 30 degrees.

Thus, the operability of the touch panel by the user can be improved. Additionally, a load of the first control unit 310 can be reduced.

The HMD 100 also includes the third sensor for detecting the position of the smartphone 300, and the adjustment unit 313 adjusts the orientation of the coordinate axes AX, based on the detection result of the third sensor. The third sensor corresponds to the camera 61 and the inner camera 68, for example.

Thus, for example, it is possible to determine whether or not to adjust the orientation of the coordinate axes AX by the adjustment unit 313, depending on whether the smartphone 300 is present within the visual field of the user. Thus, the operability of the touch panel by the user can be improved. Additionally, the load of the first control unit 310 can be reduced.

The third sensor also includes an imaging sensor.

Accordingly, the position of the smartphone 300 can be accurately detected.

Further, the smartphone 300 includes the determining unit 312 that determines whether the smartphone 300 is present within the visual field of the user, based on the detection result of the third sensor, and the adjustment unit 313 adjusts the orientation of the coordinate axes AX in accordance with the determination result of the determining unit 312.

Thus, it is possible to determine whether or not to adjust the orientation of the coordinate axes AX by the adjustment unit 313, depending on whether the smartphone 300 is present within the visual field of the user. Thus, the operability of the touch panel by the user can be improved. Additionally, the load of the first control unit 310 can be reduced.

When the determining unit 312 determines that the smartphone 300 is present within the visual field of the user, the adjustment unit 313 adjusts the orientation of the coordinate axes AX, and when the determining unit 312 determines that the smartphone 300 is not present within the visual field of the user, the adjustment unit 313 regulates the adjustment of the orientation of the coordinate axes AX.

Thus, only when the determining unit 312 determines that the smartphone 300 is present within the visual field of the user, the adjustment unit 313 can adjust the orientation of the coordinate axes AX. Thus, the operability of the touch panel by the user can be improved. Additionally, the load of the first control unit 310 can be reduced.

5. Other Exemplary Embodiments

The present disclosure is not limited to the configurations in the exemplary embodiment described above, and can be implemented in various aspects without departing from the gist of the disclosure.

For example, in the above exemplary embodiment, the "information processing device" is the smartphone 300, but the present disclosure is not limited thereto. It is sufficient that the "information processing device" is configured to be portable by the user, and provided with a coupling portion to which the HMD 100 can be coupled, a position input unit, and a control unit. For example, the "information processing device" may also be a PDA terminal, or may also be a tablet personal computer.

In the exemplary embodiment described above, the case in which the first sensor is the magnetic sensor 352 has been described, but the present disclosure is not limited thereto. It is sufficient that the first sensor includes at least one of an acceleration sensor, a gyro sensor, and a geomagnetic sensor. For example, the first sensor may be the six-axis sensor 351.

In the exemplary embodiment described above, the case in which the second sensor is the magnetic sensor 237 has been described, but the present disclosure is not limited thereto. It is sufficient that the second sensor includes at least one of an acceleration sensor, a gyro sensor, and a geomagnetic sensor. For example, the second sensor may be the six-axis sensor 235.

In the exemplary embodiment described above, the case in which the third sensors are the camera 61 and the inner camera 68 has been described, but the present disclosure is not limited thereto. It is sufficient that the third sensor detects the position of the smartphone 300. For example, the third sensor may also be the camera 61, or the third sensor may also be the inner camera 68.

Further, in the exemplary embodiments described above, the configuration in which the coupling device 10 is coupled to the image display unit 20 by wire is illustrated, however, the present disclosure is not limited thereto, and the image display unit 20 may be configured to be coupled wirelessly to the coupling device 10.

A part of the functions of the coupling device 10 may be provided in the image display unit 20. The coupling device 10 may be achieved by a plurality of devices. For example, instead of the coupling device 10, a wearable device that can be attached to the body or clothes of the user, or to the personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiments described above, the configuration in which the image display unit 20 and the coupling device 10 are separated, and are coupled via the coupling cable 40 has been illustrated as an example. The present disclosure is not limited to this, and a configuration mounted on a head of the user in which the coupling device 10 and the image display unit 20 are integrally formed may also be used.

Further, in the exemplary embodiment described above, the configuration in which the user views an outside scene through a display unit is not limited to a configuration where the right light-guiding plate 26 and the left light-guiding plate 28 transmit outside light. For example, the present disclosure is applicable to a display device configured to display an image in a state where an outside scene cannot be visually recognized. Specifically, the present disclosure can be applied to a display device configured to display captured images by the camera 61, images and CG generated based on the captured images, and movies based on the movie data stored beforehand, or the movie data input from outside. This kind of display device can include a so-called closed type display device in which an outside scene cannot be visually recognized. For example, with a configuration in which composite images created by combining together images of an outside scene captured by the camera 61, and display images are displayed by the image display unit 20, even if the image display unit 20 may not transmit outside light, the display apparatus can display the outside scenes and images so as to be viewed by the user. Of course, it is also possible to apply the present disclosure to such a so-called video see-through display device.

Additionally, instead of the image display unit 20, for example, an image display unit of another type such as an image display unit worn as a hat may be adopted, as long as the image display unit includes a display unit configured to display an image in correspondence to the left eye LE of a user, and a display unit configured to display an image in correspondence to the right eye RE of the user. Additionally, the display device may be configured, for example, as an HMD mounted on a vehicle such as a car and an airplane. Further, the display device may be configured, for example, as an HMD built into a body protector tool such as a helmet. In this case, a positioning portion to be positioned on a body of the user, and a portion to be positioned to the configured portion may be a mounting portion.

A configuration in which a virtual image was formed by the half mirrors 261 and 281 on a part of the right light-guiding plate 26 and the left light-guiding plate 28 was illustrated as an optical system configured to guide imaging light to the eyes of the user. The present disclosure is not limited thereto, and an image may be displayed either on the entire surface of the right light-guiding plate 26 and the left light-guiding plate 28, or in a display region having an area that occupies most part of the right light-guiding plate 26 and the left light-guiding plate 28. In such a case, a process for reducing an image may be included in an operation for changing a display position of the image.

In addition, the optical elements are not limited to the right light-guiding plate 26 and the left light-guiding plate 28 having half mirrors 261 and 281, and any optical components that allow the imaging light to enter the eyes of the user, specifically, diffraction grating, prisms, and holographic display units may be employed.

In addition, such a configuration may be adopted that at least some of the function blocks illustrated in FIG. 4 and FIG. 5 and the like are achieved with hardware, or achieved together with hardware and software, and the present disclosure is not limited to a configuration in which independent hardware resources are arranged as illustrated in the figures.

The control program executed by the first control unit 310 may be stored in the non-volatile storage unit 320 or another storage unit in the first control unit 310. Such a configuration may be adopted that control programs stored in external devices may be acquired via the communication unit 345 and the like to be executed.

A duplicate of a configuration formed in the coupling device 10 may be formed in the image display unit 20. For example, a processor similar to the processor of the coupling device 10 may be arranged in the image display unit 20, or the processor included in the coupling device 10 and the processor of the image display unit 20 may be configured to perform separate functions.

Further, processing units in the flowcharts illustrated in FIG. 10 and FIG. 11 are obtained by dividing the processing based on main processing contents in order to facilitate the understanding of the processing in the first control unit 310 of the smartphone 300. The exemplary embodiments are not limited by a way of the division and names of the processing units illustrated in the flowcharts illustrated in FIG. 10 and FIG. 11. The processing of the first control unit 310 can be divided into more processing units in accordance with a processing content, and can be divided such that one processing unit includes more processing. An order of the processing in the above-described flowchart is also not limited to the illustrated example.

Further, the control method of the smartphone 300 can be achieved by causing the computer included in the smartphone 300 to execute a control program corresponding to the control method of the smartphone 300. Furthermore, the control program can also be recorded in a recording medium recorded so as to be readable by a computer. The recording medium can be a magnetic recording medium, an optical recording medium, or a semiconductor memory device. Specifically, a portable or stationary type recording medium, such as a flexible disk, a Compact Disk Read Only Memory (CD-ROM), a Digital Versatile Disc (DVD), a Blu-ray (registered trademark) disc, a magneto-optical disc, a flash memory, a card type recording medium, or the like may be exemplified. The recording medium may be non-volatile storage devices such as a RAM, a ROM, and an HDD, all representing internal storages included in an image display device. The control program corresponding to the control method of the smartphone 300 is stored in a server device or the like, and thus the control method of the smartphone 300 can be achieved by downloading the control program from the server device to the smartphone 300.

What is claimed is:

1. A display system, comprising:
a display device mounted on a head of a user; and
an information processing device to which the display device is coupled, wherein
the information processing device includes
a position input unit for accepting a position input operation, and detecting a coordinate of an operating position with reference to a set coordinate axis,
a first sensor for detecting an orientation of the position input unit,
an adjustment unit for adjusting an orientation of the coordinate axis, based on a detection result of the first sensor,
a coupling portion to which the display device is couplable, and
a mode switching unit configured to execute a first mode for accepting an input detected by the position input unit as an input in an absolute coordinate on the coordinate axis, and a second mode for accepting an input detected by the position input unit as an input in a relative coordinate on the coordinate axis, and to switch between the first mode and the second mode in accordance with whether the display device is coupled to the coupling portion, to execute the first mode or the second mode.

2. The display system according to claim 1, wherein the first sensor includes at least one of an acceleration sensor, a gyro sensor, and a geomagnetic sensor.

3. The display system according to claim 1, wherein the display device includes
a display unit for displaying an image, and
a second sensor for detecting an orientation of the display unit, and
the adjustment unit adjusts the orientation of the coordinate axis, in accordance with the orientation detected by the second sensor.

4. The display system according to claim 3, wherein the second sensor includes at least one of an acceleration sensor, a gyro sensor, and a geomagnetic sensor.

5. The display system according to claim 1, wherein the mode switching unit executes the first mode when the display device is not coupled to the coupling portion, and executes the second mode when the display device is coupled to the coupling portion.

6. The display system according to claim 1, wherein the adjustment unit adjusts the orientation of the coordinate axis in a stepwise manner.

7. The display system according to claim 1, wherein the display device includes a third sensor for detecting a position of the information processing device, and
the adjustment unit adjusts the orientation of the coordinate axis, based on a detection result of the third sensor.

8. The display system according to claim 7, wherein the third sensor includes an imaging sensor.

9. The display system according to claim 7, wherein the information processing device includes a determining unit for determining whether the information processing device is present within a visual field of the user, based on the detection result of the third sensor, and
the adjustment unit adjusts the orientation of the coordinate axis, in accordance with a determination result of the determining unit.

10. The display system according to claim 9, wherein when the determining unit determines that the information processing device is present within the visual field of the user, the adjustment unit adjusts the orientation of the coordinate axis, and when the determining unit determines that the information processing device is not present within the visual field of the user, the adjustment unit regulates the adjustment of the orientation of the coordinate axis.

11. A non-transitory computer-readable storage medium storing a control program for an information processing device that includes a computer and a coupling portion to which a display device mounted on a head of a user is couplable, wherein
the control program causes the computer to function
as a detector for accepting a position input operation, and detecting an orientation of a position input unit for detecting a coordinate of an operating position with reference to a set coordinate axis,
as an adjustment unit for adjusting an orientation of the coordinate axis, based on a detection result of the detector, and
as a mode switch for executing a first mode for accepting an input detected by the detector as an input in an absolute coordinate on the coordinate axis, and a second mode for accepting an input detected by the detector as an input in a relative coordinate on the coordinate axis, and for switching between the first mode and the second mode in accordance with whether the display device is coupled to the coupling portion, to execute the first mode or the second mode.

12. A method for controlling an information processing device having a coupling portion to which a display device mounted on a head of a user is couplable, the method comprising:
a detection step for accepting a position input operation, and detecting an orientation of a position input unit for detecting a coordinate of an operating position with reference to a set coordinate axis, and
an adjustment step for adjusting an orientation of the coordinate axis, based on a detection result in the detection step, and
a mode switching step for executing a first mode for accepting an input detected in the detection step as an input in an absolute coordinate on the coordinate axis, and a second mode for accepting an input detected in the detection step as an input in a relative coordinate on the coordinate axis, and for switching between the first mode and the second mode in accordance with whether the display device is coupled to the coupling portion, to execute the first mode or the second mode.

13. A display system, comprising:
a display device mounted on a head of a user; and
an information processing device to which the display device is coupled, wherein the information processing device includes
a position input unit for accepting a position input operation, and detecting a coordinate of an operating position with reference to a set coordinate axis;
a first sensor for detecting an orientation of the position input unit; and an adjustment unit for adjusting an orientation of the coordinate axis, based on a detection result of the first sensor,
the display device includes a third sensor for detecting a position of the information processing device,
the adjustment unit adjusts the orientation of the coordinate axis, based on a detection result of the third sensor,
the information processing device includes a determining unit for determining whether the information processing device is present within a visual field of the user, based on the detection result of the third sensor,
the adjustment unit adjusts the orientation of the coordinate axis, in accordance with a determination result of the determining unit, and
when the determining unit determines that the information processing device is present within the visual field of the user, the adjustment unit adjusts the orientation of the coordinate axis, and when the determining unit determines that the information processing device is not present within the visual field of the user, the adjustment unit regulates the adjustment of the orientation of the coordinate axis.

* * * * *